US009746747B2

(12) United States Patent
Testa et al.

(10) Patent No.: US 9,746,747 B2
(45) Date of Patent: Aug. 29, 2017

(54) OPTICAL SWITCH, OPTICAL SWITCH APPARATUS AND NODE, AND COMMUNICATION NETWORK

(71) Applicant: Telefonaktiebolaget LM Ericsson (publ), Stockholm (SE)

(72) Inventors: Francesco Testa, Pisa (IT); Alberto Bianchi, Pisa (IT); Fabio Cavaliere, Pisa (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/914,422

(22) PCT Filed: Aug. 30, 2013

(86) PCT No.: PCT/EP2013/068003
§ 371 (c)(1),
(2) Date: Feb. 25, 2016

(87) PCT Pub. No.: WO2015/028086
PCT Pub. Date: Mar. 5, 2015

(65) Prior Publication Data
US 2016/0209724 A1 Jul. 21, 2016

(51) Int. Cl.
*G02F 1/313* (2006.01)
*H04Q 11/00* (2006.01)
(Continued)

(52) U.S. Cl.
CPC ............ *G02F 1/3134* (2013.01); *G02F 1/011* (2013.01); *G02F 1/313* (2013.01);
(Continued)

(58) Field of Classification Search
CPC combination set(s) only.
See application file for complete search history.

(56) References Cited

U.S. PATENT DOCUMENTS

2003/0128980 A1* 7/2003 Abeles ............ H04B 10/25756
398/48
2004/0150268 A1* 8/2004 Garito ...................... B82Y 5/00
385/50

(Continued)

FOREIGN PATENT DOCUMENTS

| CN | 103091784 A | 5/2013 |
| WO | 2009060754 A1 | 5/2009 |
| WO | 2012152343 A1 | 11/2012 |

OTHER PUBLICATIONS

Assaf Shacham,Photonic Networks-on-Chip for Future Generations of Chip Multiprocessors—IEEE Transactions on Computers, vol. 57, No. 9, Sep. 2008, pp. 1246-1258.*

(Continued)

*Primary Examiner* — David Payne
*Assistant Examiner* — Omar S Ismail
(74) *Attorney, Agent, or Firm* — Leffler Intellectual Property Law, PLLC

(57) ABSTRACT

An optical switch has four optical ports; a first optical waveguide coupled between a first of said ports and a second of the ports; a first switch element provided between the first waveguide and a second optical waveguide that is coupled to a third of the ports; a second switch element provided between the first waveguide and a third optical waveguide that is coupled to a fourth of the ports. Each switch element has a micro-ring resonator having an active state in which it is coupled to the first waveguide and to a respective one of the second and third waveguides for optical signals at a preselected wavelength, and an inactive state in which no coupling occurs. Each switch element has a control element arranged to receive a respective control signal configured to cause it to switch the micro-ring resonator between said states.

12 Claims, 15 Drawing Sheets

(51) Int. Cl.
*G02F 1/01* (2006.01)
*H04B 10/25* (2013.01)
*G02F 1/31* (2006.01)

(52) U.S. Cl.
CPC ..... *H04B 10/2504* (2013.01); *H04Q 11/0005* (2013.01); *G02F 2001/311* (2013.01); *H04Q 2011/0016* (2013.01); *H04Q 2011/0039* (2013.01); *H04Q 2011/0058* (2013.01)

(56) References Cited

U.S. PATENT DOCUMENTS

2006/0008272 A1* 1/2006 Abeles ............. H04B 10/25756
398/48
2016/0173225 A1* 6/2016 Cavaliere ............ H04J 14/0287
398/7
2016/0212510 A1* 7/2016 Bogoni .................. H04J 14/04

OTHER PUBLICATIONS

PCT International Search Report, mailed Mar. 5, 2014, in connection with International Application No. PCT/EP2013/068003, all pages.

N. Sherwood-Droz et al., Optical 4×4 hitless silicon router for optical Networks-on-Chip (NoC), Optics Express, vol. 16, No. 20, Sep. 29, 2008, 8 pages.

A. Bianco et al., Microring resonators: Opportunities and challenges for future optical networks, 2013 15th International Conference on Transparent Optical Networks (ICTON), IEEE, Jun. 23, 2013, pp. 1-4.

C.T. Zheng et al., Microring-Based $N\times N$ Scalable Polymeric Electrooptic Routing Switch Array: Theory, Architecture, and Design Scheme, IEEE Photonic Journal, IEEE, vol. 5, No. 3, Jun. 1, 2013, 21 pages.

JDSU, White Paper: A Performance Comparison of WSS Switch Engine Technologies, pp. 1-24.

A.W. Poon et al, Cascaded Microresonator-Based Matrix Switch for Silicon On-Chip Optical Interconnection, Proceedings of the IEEE, vol. 97, No. 7, Jul. 2009, pp. 1216-1238.

E.J. Klein et al., Densely integrated microring resonator based photonic devices for use in access networks, Optics Express, vol. 15, No. 16, Aug. 6, 2007, 10 pages.

International Preliminary Report on Patentability, issued Mar. 1, 2016, in connection with International Application No. PCT/EP2013/068003, all pages.

* cited by examiner

OPTICAL SWITCH, OPTICAL SWITCH APPARATUS AND NODE, AND COMMUNICATION NETWORK

TECHNICAL FIELD

The invention relates to an optical switch, optical switching apparatus, a communication network switching node and a communication network.

BACKGROUND

Dense wavelength division multiplexing, DWDM, technology has widespread application in metro networks. It can offer advantages in term of bandwidth capabilities and scalability also in mobile backhaul and radio access networks, particularly because demand for broadband services and bandwidth, especially peak rate and cell load, is increasing with time. DWDM permits ultra-broad dedicated bandwidth and very low latency for each or a cluster of radio base stations. A typical mobile backhaul network comprises two aggregation stages, namely low radio access network, LRAN, and high radio access network, HRAN, characterized respectively by hundreds and thousands of connections, using Layer 2/3 switches.

Optical switches can be used in place of electric switches to offer energy saving and increased bandwidth. Current solutions for optical switches are typically based on Wavelength selective devices (WSS) which are costly and bulky devices based on complex free space optics. This has prevented the introduction of photonic switching in access and mobile backhaul networks where the capacities involved are lower, ranging from 10s up to 100s Gbps, where cost and footprint are critical characteristics and where the required performances are lower than in WSS devices due a lower number of nodes traversed and to shorter inter-nodal path lengths. E. J. Klein et al "Densely integrated microring resonator based photonic devices for use in access networks", Optics Express, pages 10346-10355, vol. 15, no. 16, 6 Aug. 2007, reports two reconfigurable optical add-drop multiplexers and a 1×4×4 reconfigurable wavelength-router based on thermally tunable vertically coupled micro-ring resonators fabricated in $Si_3N_4/SiO_2$.

SUMMARY

It is an object to provide an improved optical switch. It is a further object to provide an improved optical switching apparatus. It is a further object to provide an improved communication network switching node. It is a further object to provide an improved communication network.

A first aspect of the invention provides an optical switch comprising four optical ports, a first optical waveguide, a first switch element and a second switch element. The first optical waveguide is coupled between a first of said optical ports and a second of said optical ports. The first switch element is provided between the first optical waveguide and a second optical waveguide. The second optical waveguide is coupled to a third of said optical ports. The second switch element is provided between the first optical waveguide and a third optical waveguide. The third optical waveguide is coupled to a fourth of said optical ports. Each said switch element comprises a micro-ring resonator having an active state and an inactive state. In the active state, the micro-ring resonation is coupled to the first waveguide and to a respective one of the second and third waveguides for optical signals at a preselected wavelength. In the inactive state no coupling occurs. Each switch element comprises a control element arranged to receive a respective control signal configured to cause it to switch the micro-ring resonator between said states.

The optical switch may simultaneously add/drop optical signals of the same wavelength coming from opposite directions. This is a significant improvement over existing optical add/drop multiplexers, which do not offer this functionality. The optical switch may terminate one wavelength coming from one direction and by-pass another wavelength coming from the opposite direction, by-pass different wavelengths coming from both directions or bypass optical signals of the same wavelength coming from opposite directions. The optical switch may therefore provide transparent and energy efficient optical by pass of express channels, and bidirectional operation which supports add, drop and by-pass functions for WDM signals. The optical switch may offer a low cost, miniaturized optical switch enabling optical switching in access and mobile backhaul networks.

In an embodiment, the optical switch further comprises a fourth waveguide, a third said switch element, a fourth said switch element and optical modulation apparatus. The fourth waveguide is coupled between the third and fourth optical ports. The third switch element is provided between the second and fourth optical waveguides. The fourth switch element is provided between the third and fourth optical waveguides. The micro-ring resonators of the third and fourth switch elements in their active states being coupled to the fourth waveguide and a respective one of the second and third waveguides. The optical modulation apparatus is arranged to modulate optical signals coupled into the second and third optical waveguides.

The modulation apparatus may enable the optical switch to perform modulation of remotely distributed optical carriers or remodulation of received downstream optical signals to thereby support wavelength reuse.

In an embodiment, the optical modulation apparatus comprises a micro-ring modulator coupled to the second optical waveguide and coupled to the third optical waveguide. The micro-ring modulator is arranged to receive a respective modulation signal arranged to cause it to apply a respective modulation to an optical signal in either of the second and third optical waveguide.

In an embodiment, the optical modulation apparatus comprises a first micro-ring modulator coupled to the second optical waveguide and a second micro-ring modulator coupled to the third optical waveguide. Each micro-ring modulator is arranged to receive a respective modulation signal arranged to cause it to apply a respective modulation to a respective optical signal. The micro-ring modulators may be used to modulate or re-modulate an optical signal switched from the first waveguide or the fourth waveguide by a respective one of the switch elements, the optical signals propagating through the respective waveguide in either direction.

In an embodiment, the optical modulation apparatus comprises the micro-ring resonator of one of the first and third switch elements and the micro-ring resonator of one of the second and fourth switch elements. The micro-ring resonators may be used both to couple optical signals and to modulate or re-modulate an optical signal switched from the first waveguide or the fourth waveguide by a respective one of the switch elements, the optical signals propagating through the respective waveguide in either direction.

A second aspect of the invention provides optical switching apparatus comprising a plurality of optical switches, an electrical cross-point switch matrix and a controller. Each optical switch comprises four optical ports, a first optical waveguide, a first switch element and a second switch element. The first optical waveguide is coupled between a first of said optical ports and a second of said optical ports. The first switch element is provided between the first optical waveguide and a second optical waveguide. The second optical waveguide is coupled to a third of said optical ports. The second switch element is provided between the first optical waveguide and a third optical waveguide. The third optical waveguide is coupled to a fourth of said optical ports. Each said switch element comprises a micro-ring resonator having an active state and an inactive state. In the active state, the micro-ring resonation is coupled to the first waveguide and to a respective one of the second and third waveguides for optical signals at a preselected wavelength. In the inactive state no coupling occurs. Each switch element comprises a control element arranged to receive a respective control signal configured to cause it to switch the micro-ring resonator between said states. The optical switches share the same first optical waveguide and each have a respective second and third waveguide. The electrical cross-point switch matrix is in communication with the optical switches and is arranged to receive communications signals from a communication network. The controller is arranged to generate and transmit respective control signals to the switch elements.

The optical switching apparatus may simultaneously add/drop optical signals of the same wavelength coming from opposite directions. The optical switching apparatus may terminate one wavelength coming from one direction and by-pass another wavelength coming from the opposite direction, by-pass different wavelengths coming from both directions or bypass optical signals of the same wavelength coming from opposite directions. The optical switching apparatus may therefore provide transparent and energy efficient optical by pass of express channels, and bidirectional operation which supports add, drop and by-pass functions for WDM signals. The electrical cross-point switch matrix may enable flexible connection of signals to be added and dropped to any of the switch elements. The optical switching apparatus may therefore have 'colourless' operation.

In an embodiment, said plurality of optical switches comprises a first optical switch and a second optical switch, and the optical switching apparatus further comprises first and second photodetectors, and a modulation driver. The first optical switch comprises four optical ports, a first optical waveguide, a first switch element and a second switch element. The first optical waveguide is coupled between a first of said optical ports and a second of said optical ports. The first switch element is provided between the first optical waveguide and a second optical waveguide. The second optical waveguide is coupled to a third of said optical ports. The second switch element is provided between the first optical waveguide and a third optical waveguide. The third optical waveguide is coupled to a fourth of said optical ports. Each said switch element comprises a micro-ring resonator having an active state and an inactive state. In the active state, the micro-ring resonation is coupled to the first waveguide and to a respective one of the second and third waveguides for optical signals at a preselected wavelength. In the inactive state no coupling occurs. Each switch element comprises a control element arranged to receive a respective control signal configured to cause it to switch the micro-ring resonator between said states. The second optical switch comprises four optical ports, a first optical waveguide, a first switch element and a second switch element. The first optical waveguide is coupled between a first of said optical ports and a second of said optical ports. The first switch element is provided between the first optical waveguide and a second optical waveguide. The second optical waveguide is coupled to a third of said optical ports. The second switch element is provided between the first optical waveguide and a third optical waveguide. The third optical waveguide is coupled to a fourth of said optical ports. Each said switch element comprises a micro-ring resonator having an active state and an inactive state. In the active state, the micro-ring resonation is coupled to the first waveguide and to a respective one of the second and third waveguides for optical signals at a preselected wavelength. In the inactive state no coupling occurs. Each switch element comprises a control element arranged to receive a respective control signal configured to cause it to switch the micro-ring resonator between said states. The second optical switch further comprises a fourth waveguide, a third said switch element, a fourth said switch element and optical modulation apparatus. The fourth waveguide is coupled between the third and fourth optical ports. The third switch element is provided between the second and fourth optical waveguides. The fourth switch element is provided between the third and fourth optical waveguides. The micro-ring resonators of the third and fourth switch elements in their active states being coupled to the fourth waveguide and a respective one of the second and third waveguides. The optical modulation apparatus is arranged to modulate optical signals coupled into the second and third optical waveguides. The first and second photodetectors are coupled to the third and fourth optical ports respectively of the first optical switch. Each photodetector has an output coupled to a respective input of the electrical cross-point switch matrix. The modulation driver is arranged to receive a communication signal from the electrical cross-point switch. The modulation driver is arranged to generate and transmit modulation signals to the modulation apparatus.

The modulation apparatus may enable each optical switch to perform modulation of remotely distributed optical carriers or remodulation of received downstream optical signals to thereby support wavelength reuse. The modulation driver may enable flexible connection of signals to be added to any of the switch elements from the electrical cross-point switch matrix. The optical switching apparatus may therefore have 'colourless' add operation.

In an embodiment, the optical modulation apparatus comprises a micro-ring modulator coupled to the second optical waveguide and coupled to the third optical waveguide. The micro-ring modulator is arranged to receive a respective modulation signal arranged to cause it to apply a respective modulation to an optical signal in either of the second and third optical waveguide.

In an embodiment, the optical modulation apparatus comprises a first micro-ring modulator coupled to the second optical waveguide and a second micro-ring modulator coupled to the third optical waveguide. Each micro-ring modulator is arranged to receive a respective modulation signal arranged to cause it to apply a respective modulation to a respective optical signal. The micro-ring modulators may be used to modulate or re-modulate an optical signal switched from the first waveguide or the fourth waveguide by a respective one of the switch elements, the optical signals propagating through the respective waveguide in either direction.

In an embodiment, the optical modulation apparatus comprises the micro-ring resonator of one of the first and third switch elements and the micro-ring resonator of one of the second and fourth switch elements. The micro-ring resonators may be used both to couple optical signals and to modulate or re-modulate an optical signal switched from the first waveguide or the fourth waveguide by a respective one of the switch elements, the optical signals propagating through the respective waveguide in either direction.

In an embodiment, the optical switching apparatus comprises a plurality of said first optical switches, a plurality of photodetectors, and a plurality of said second optical switches. Each photodetector is coupled to a respective port of a respective first optical switch and each photodetector has an output coupled to a respective input of the electrical cross-point switch matrix. The second optical switches share the same fourth waveguide. The optical switching apparatus may support remote carrier distribution, and may receive carrier optical signals from two opposite directions.

In an embodiment, the optical switching apparatus comprises a further plurality of said first optical switches and a further plurality of said photodetectors. Each said first optical switch comprises first and second switch elements provided between the fourth waveguide and the respective second and third waveguide. The photodetectors are each coupled to a respective port of a respective first optical switch and the photodetectors each have an output coupled to a respective input of the electrical cross-point switch matrix. The optical switching apparatus may support remote carrier distribution from either of the first and fourth optical waveguide, and may receive carrier optical signals from both, opposing, directions of the waveguides. The optical switching apparatus may therefore support protection switching, enabling remote carrier distribution to be changed from the first waveguide to the fourth waveguide or to be changed from one direction to the opposing direction of the same waveguide.

In an embodiment, said optical switches each comprise four optical ports, a first optical waveguide, a first switch element and a second switch element. The first optical waveguide is coupled between a first of said optical ports and a second of said optical ports. The first switch element is provided between the first optical waveguide and a second optical waveguide. The second optical waveguide is coupled to a third of said optical ports. The second switch element is provided between the first optical waveguide and a third optical waveguide. The third optical waveguide is coupled to a fourth of said optical ports. Each said switch element comprises a micro-ring resonator having an active state and an inactive state. In the active state, the micro-ring resonation is coupled to the first waveguide and to a respective one of the second and third waveguides for optical signals at a preselected wavelength. In the inactive state no coupling occurs. Each switch element comprises a control element arranged to receive a respective control signal configured to cause it to switch the micro-ring resonator between said states. Each optical switch further comprises a fourth waveguide, a third said switch element, a fourth said switch element and optical modulation apparatus. The fourth waveguide is coupled between the third and fourth optical ports. The third switch element is provided between the second and fourth optical waveguides. The fourth switch element is provided between the third and fourth optical waveguides. The micro-ring resonators of the third and fourth switch elements in their active states being coupled to the fourth waveguide and a respective one of the second and third waveguides. The optical modulation apparatus is arranged to modulate optical signals coupled into the second and third optical waveguides. Each optical switch shares the same fourth waveguide. The optical switching apparatus further comprises a plurality of optical splitters, demodulation apparatus, a plurality of photodetectors and a modulation driver. The demodulation apparatus is coupled to the second and third waveguide of each optical switch by respective ones of the optical splitters. Each photodetector is coupled to the demodulation apparatus and each photodetector has an output coupled to a respective input of the electrical cross-point switch matrix. The modulation driver is arranged to receive a communication signal from the electrical cross-point switch and arranged to generate and transmit modulation signals to the modulation apparatus.

The optical switching apparatus may support wavelength reuse, allowing downstream optical signals to be both detected and remodulated for upsteam transmission, and may receive downstream optical signals from two opposite directions, for remodulation and upstream transmission. The optical switching apparatus may therefore support protection switching, enabling the direction of transmission of downstream signals to be changed from one direction to the opposing direction of the first waveguide, while still enabling remodulation for upstream transmission.

The demodulation apparatus comprises a plurality of demodulators. Each demodulator is coupled to the second and third waveguide of the respective optical switch. Each photodetector is coupled to a respective demodulation apparatus.

A third aspect of the invention provides a communication network switching node comprising optical switching apparatus, optical to electrical signal conversion apparatus and electrical to optical signal conversion apparatus. The optical switching apparatus comprises a plurality of optical switches, an electrical cross-point switch matrix and a controller. Each optical switch comprises four optical ports, a first optical waveguide, a first switch element and a second switch element. The first optical waveguide is coupled between a first of said optical ports and a second of said optical ports. The first switch element is provided between the first optical waveguide and a second optical waveguide. The second optical waveguide is coupled to a third of said optical ports. The second switch element is provided between the first optical waveguide and a third optical waveguide. The third optical waveguide is coupled to a fourth of said optical ports. Each said switch element comprises a micro-ring resonator having an active state and an inactive state. In the active state, the micro-ring resonation is coupled to the first waveguide and to a respective one of the second and third waveguides for optical signals at a preselected wavelength. In the inactive state no coupling occurs. Each switch element comprises a control element arranged to receive a respective control signal configured to cause it to switch the micro-ring resonator between said states. The optical switches share the same first optical waveguide and each have a respective second and third waveguide. The electrical cross-point switch matrix is in communication with the controller, which is arranged to generate and transmit respective control signals to the switch elements. The optical ports of the optical switching apparatus are arranged to couple the first and fourth optical waveguides to a first optical communication network. The optical to electrical signal conversion apparatus is coupled to the electrical cross-point switch matrix and is arranged to receive optical signals from a second optical communication network. The electrical to optical signal conversion apparatus is coupled to the electrical cross-point switch matrix and is arranged to output optical signals to the second optical communication network.

The node may simultaneously add/drop optical signals of the same wavelength coming from opposite directions. This is a significant improvement over existing optical add/drop multiplexing nodes, which do not offer this functionality. The node may terminate one wavelength coming from one direction and by-pass another wavelength coming from the opposite direction, by-pass different wavelengths coming from both directions or bypass optical signals of the same wavelength coming from opposite directions, within the first optical communication network. The node may therefore provide transparent and energy efficient optical by pass of express channels, and bidirectional operation which supports add, drop and by-pass functions for WDM signals. The node may offer a low cost, miniaturized structure enabling optical switching in access and mobile backhaul networks. The node may enable changing the direction of line input and output ports in the optical switching apparatus which may enable the node to react to a failure within the first optical communication network. The node may ensure upstream/downstream symmetry within the first communication network, which may enable it to be used in Common Public Radio Interface, CPRI, links.

In an embodiment, each optical switch further comprises a fourth waveguide, a third said switch element, a fourth said switch element and optical modulation apparatus. The fourth waveguide is coupled between the third and fourth optical ports. The third switch element is provided between the second and fourth optical waveguides. The fourth switch element is provided between the third and fourth optical waveguides. The micro-ring resonators of the third and fourth switch elements in their active states being coupled to the fourth waveguide and a respective one of the second and third waveguides. The optical modulation apparatus is arranged to modulate optical signals coupled into the second and third optical waveguides.

The modulation apparatus may enable each optical switch to perform modulation of remotely distributed optical carriers or remodulation of received downstream optical signals to thereby support wavelength reuse.

In an embodiment, the optical modulation apparatus comprises a micro-ring modulator coupled to the second optical waveguide and coupled to the third optical waveguide. The micro-ring modulator is arranged to receive a respective modulation signal arranged to cause it to apply a respective modulation to an optical signal in either of the second and third optical waveguide.

In an embodiment, the optical modulation apparatus comprises a first micro-ring modulator coupled to the second optical waveguide and a second micro-ring modulator coupled to the third optical waveguide. Each micro-ring modulator is arranged to receive a respective modulation signal arranged to cause it to apply a respective modulation to a respective optical signal. The micro-ring modulators may be used to modulate or re-modulate an optical signal switched from the first waveguide or the fourth waveguide by a respective one of the switch elements, the optical signals propagating through the respective waveguide in either direction.

In an embodiment, the optical modulation apparatus comprises the micro-ring resonator of one of the first and third switch elements and the micro-ring resonator of one of the second and fourth switch elements. The micro-ring resonators may be used both to couple optical signals and to modulate or re-modulate an optical signal switched from the first waveguide or the fourth waveguide by a respective one of the switch elements, the optical signals propagating through the respective waveguide in either direction.

In an embodiment, said plurality of optical switches comprises a first optical switch and a second optical switch, and the optical switching apparatus further comprises first and second photodetectors, and a modulation driver. The first optical switch comprises four optical ports, a first optical waveguide, a first switch element and a second switch element. The first optical waveguide is coupled between a first of said optical ports and a second of said optical ports. The first switch element is provided between the first optical waveguide and a second optical waveguide. The second optical waveguide is coupled to a third of said optical ports. The second switch element is provided between the first optical waveguide and a third optical waveguide. The third optical waveguide is coupled to a fourth of said optical ports. Each said switch element comprises a micro-ring resonator having an active state and an inactive state. In the active state, the micro-ring resonation is coupled to the first waveguide and to a respective one of the second and third waveguides for optical signals at a preselected wavelength. In the inactive state no coupling occurs. Each switch element comprises a control element arranged to receive a respective control signal configured to cause it to switch the micro-ring resonator between said states. The second optical switch comprises four optical ports, a first optical waveguide, a first switch element and a second switch element. The first optical waveguide is coupled between a first of said optical ports and a second of said optical ports. The first switch element is provided between the first optical waveguide and a second optical waveguide. The second optical waveguide is coupled to a third of said optical ports. The second switch element is provided between the first optical waveguide and a third optical waveguide. The third optical waveguide is coupled to a fourth of said optical ports. Each said switch element comprises a micro-ring resonator having an active state and an inactive state. In the active state, the micro-ring resonation is coupled to the first waveguide and to a respective one of the second and third waveguides for optical signals at a preselected wavelength. In the inactive state no coupling occurs. Each switch element comprises a control element arranged to receive a respective control signal configured to cause it to switch the micro-ring resonator between said states. The second optical switch further comprises a fourth waveguide, a third said switch element, a fourth said switch element and optical modulation apparatus. The fourth waveguide is coupled between the third and fourth optical ports. The third switch element is provided between the second and fourth optical waveguides. The fourth switch element is provided between the third and fourth optical waveguides. The micro-ring resonators of the third and fourth switch elements in their active states being coupled to the fourth waveguide and a respective one of the second and third waveguides. The optical modulation apparatus is arranged to modulate optical signals coupled into the second and third optical waveguides. The first and second photodetectors are coupled to the third and fourth optical ports respectively of the first optical switch. Each photodetector has an output coupled to a respective input of the electrical cross-point switch matrix. The modulation driver is arranged to receive a communication signal from the electrical cross-point switch. The modulation driver is arranged to generate and transmit modulation signals to the modulation apparatus.

The modulation apparatus may enable each optical switch to perform modulation of remotely distributed optical carriers or remodulation of received downstream optical signals to thereby support wavelength reuse. The modulation driver may enable flexible connection of signals to be added to any of the switch elements from the electrical cross-point switch matrix. The node may therefore have 'colourless' add operation.

In an embodiment, the optical modulation apparatus comprises a micro-ring modulator coupled to the second optical waveguide and coupled to the third optical waveguide. The micro-ring modulator is arranged to receive a respective modulation signal arranged to cause it to apply a respective modulation to an optical signal in either of the second and third optical waveguide.

In an embodiment, the optical modulation apparatus comprises a first micro-ring modulator coupled to the second optical waveguide and a second micro-ring modulator coupled to the third optical waveguide. Each micro-ring modulator is arranged to receive a respective modulation signal arranged to cause it to apply a respective modulation to a respective optical signal. The micro-ring modulators may be used to modulate or re-modulate an optical signal switched from the first waveguide or the fourth waveguide by a respective one of the switch elements, the optical signals propagating through the respective waveguide in either direction.

In an embodiment, the optical modulation apparatus comprises the micro-ring resonator of one of the first and third switch elements and the micro-ring resonator of one of the second and fourth switch elements. The micro-ring resonators may be used both to couple optical signals and to modulate or re-modulate a respective optical signal switched from the first waveguide or the fourth waveguide by a respective one of the switch elements, the optical signals propagating through the respective waveguide in either direction.

In an embodiment, the optical switching apparatus comprises a plurality of said first optical switches, a plurality of photodetectors, and a plurality of said second optical switches. Each photodetector is coupled to a respective port of a respective first optical switch and each photodetector has an output coupled to a respective input of the electrical cross-point switch matrix. The second optical switches share the same fourth waveguide. The node may support remote carrier distribution, and may receive carrier optical signals from two opposite directions.

In an embodiment, the optical switching apparatus comprises a further plurality of said first optical switches and a further plurality of said photodetectors. Each said first optical switch comprises first and second switch elements provided between the fourth waveguide and the respective second and third waveguide. The photodetectors are each coupled to a respective port of a respective first optical switch and the photodetectors each have an output coupled to a respective input of the electrical cross-point switch matrix. The node may support remote carrier distribution from either of the first and fourth optical waveguide, and may receive carrier optical signals from both, opposing, directions of the waveguides. The node may therefore support protection switching, enabling remote carrier distribution to be changed from the first waveguide to the fourth waveguide or to be changed from one direction to the opposing direction of the same waveguide.

In an embodiment, said optical switches each comprise four optical ports, a first optical waveguide, a first switch element and a second switch element. The first optical waveguide is coupled between a first of said optical ports and a second of said optical ports. The first switch element is provided between the first optical waveguide and a second optical waveguide. The second optical waveguide is coupled to a third of said optical ports. The second switch element is provided between the first optical waveguide and a third optical waveguide. The third optical waveguide is coupled to a fourth of said optical ports. Each said switch element comprises a micro-ring resonator having an active state and an inactive state. In the active state, the micro-ring resonation is coupled to the first waveguide and to a respective one of the second and third waveguides for optical signals at a preselected wavelength. In the inactive state no coupling occurs. Each switch element comprises a control element arranged to receive a respective control signal configured to cause it to switch the micro-ring resonator between said states. Each optical switch further comprises a fourth waveguide, a third said switch element, a fourth said switch element and optical modulation apparatus. The fourth waveguide is coupled between the third and fourth optical ports. The third switch element is provided between the second and fourth optical waveguides. The fourth switch element is provided between the third and fourth optical waveguides. The micro-ring resonators of the third and fourth switch elements in their active states being coupled to the fourth waveguide and a respective one of the second and third waveguides. The optical modulation apparatus is arranged to modulate optical signals coupled into the second and third optical waveguides. Each optical switch shares the same fourth waveguide. The optical switching apparatus further comprises a plurality of optical splitters, demodulation apparatus, a plurality of photodetectors and a modulation driver. The demodulation apparatus is coupled to the second and third waveguide of each optical switch. Each photodetector is coupled to the demodulation apparatus and each photodetector has an output coupled to a respective input of the electrical cross-point switch matrix. The modulation driver is arranged to receive a communication signal from the electrical cross-point switch and arranged to generate and transmit modulation signals to the modulation apparatus.

The node may support wavelength reuse, allowing downstream optical signals to be both detected and remodulated for upsteam transmission, and may receive downstream optical signals from two opposite directions, for remodulation and upstream transmission. The node may therefore support protection switching, enabling the direction of transmission of downstream signals to be changed from one direction to the opposing direction of the first waveguide, while still enabling remodulation for upstream transmission.

The demodulation apparatus comprises a plurality of demodulators. Each demodulator is coupled to the second and third waveguide of the respective optical switch. Each photodetector is coupled to a respective demodulation apparatus.

In an embodiment, the first optical communication network is a high radio access network and the second optical communication network is a low radio access network.

A fourth aspect of the invention provides a communication network comprising a hub node, a plurality of communication network switching nodes, an internal optical fibre ring and an external optical fibre ring. Each communication network switching node comprises optical switching apparatus, optical to electrical signal conversion apparatus and electrical to optical signal conversion apparatus. The optical switching apparatus comprises a plurality of optical switches, an electrical cross-point switch matrix and a controller. Each optical switch comprises four optical ports, a first optical waveguide, a first switch element and a second switch element. The first optical waveguide is coupled between a first of said optical ports and a second of said optical ports. The first switch element is provided between the first optical waveguide and a second optical waveguide.

The second optical waveguide is coupled to a third of said optical ports. The second switch element is provided between the first optical waveguide and a third optical waveguide. The third optical waveguide is coupled to a fourth of said optical ports. Each said switch element comprises a micro-ring resonator having an active state and an inactive state. In the active state, the micro-ring resonation is coupled to the first waveguide and to a respective one of the second and third waveguides for optical signals at a preselected wavelength. In the inactive state no coupling occurs. Each switch element comprises a control element arranged to receive a respective control signal configured to cause it to switch the micro-ring resonator between said states. The optical switches share the same first optical waveguide and each have a respective second and third waveguide. The electrical cross-point switch matrix is in communication with the optical switches and is arranged to receive communications signals from a communication network. The controller is arranged to generate and transmit respective control signals to the switch elements. The optical ports of the optical switching apparatus are arranged to couple the first and fourth optical waveguides to a first optical communication network. The optical to electrical signal conversion apparatus is coupled to the electrical cross-point switch matrix and is arranged to receive optical signals from a second optical communication network. The electrical to optical signal conversion apparatus is coupled to the electrical cross-point switch matrix and is arranged to output optical signals to the second optical communication network.

The network may provide transparent and energy efficient optical by pass of express channels and bidirectional operation, which supports add, drop and by-pass functions for WDM signals. The network may be used within an access or mobile backhaul network. The node may enable changing the direction of line input and output ports in the optical switching apparatus which may enable the network to react to a failure either the internal or external optical fibre ring. The network may provide upstream/downstream symmetry, which may enable it to be used in Common Public Radio Interface, CPRI, links.

The internal optical fibre ring comprises a plurality of optical fibre links. Each link of the internal optical fibre ring is coupled to the first optical waveguides of a respective pair of said communication network switching nodes. The external optical fibre ring comprises a plurality of optical fibre links. Each link of the external optical fibre ring is coupled to the fourth optical waveguides of a respective pair of said communication network switching nodes. The hub node is arranged to cause the communication network to operate in one of a normal mode and a protection mode. In the normal mode the hub causes downstream optical signals to propagate around one of the internal optical fibre ring and the external fibre ring in a first direction and causes upstream optical signals to propagate around the other of the internal optical fibre ring and the external fibre ring in a second direction, opposite to the first direction. In the protection mode the hub causes downstream optical signals to propagate around the other of the internal optical fibre ring and the external fibre ring in the second direction and causes upstream optical signal to propagate around the other of the internal optical fibre ring and the external fibre ring in the first direction.

In an embodiment, the first optical communication network is a high radio access network and the second optical communication network is a low radio access network.

In an embodiment, each optical switch further comprises a fourth waveguide, a third said switch element, a fourth said switch element and optical modulation apparatus. The fourth waveguide is coupled between the third and fourth optical ports. The third switch element is provided between the second and fourth optical waveguides. The fourth switch element is provided between the third and fourth optical waveguides. The micro-ring resonators of the third and fourth switch elements in their active states being coupled to the fourth waveguide and a respective one of the second and third waveguides. The optical modulation apparatus is arranged to modulate optical signals coupled into the second and third optical waveguides.

The modulation apparatus may enable each optical switch to perform modulation of remotely distributed optical carriers or remodulation of received downstream optical signals to thereby enable the network to support wavelength reuse.

In an embodiment, said plurality of optical switches comprises a first optical switch and a second optical switch, and the optical switching apparatus further comprises first and second photodetectors, and a modulation driver. The first optical switch comprises four optical ports, a first optical waveguide, a first switch element and a second switch element. The first optical waveguide is coupled between a first of said optical ports and a second of said optical ports. The first switch element is provided between the first optical waveguide and a second optical waveguide. The second optical waveguide is coupled to a third of said optical ports. The second switch element is provided between the first optical waveguide and a third optical waveguide. The third optical waveguide is coupled to a fourth of said optical ports. Each said switch element comprises a micro-ring resonator having an active state and an inactive state. In the active state, the micro-ring resonation is coupled to the first waveguide and to a respective one of the second and third waveguides for optical signals at a preselected wavelength. In the inactive state no coupling occurs. Each switch element comprises a control element arranged to receive a respective control signal configured to cause it to switch the micro-ring resonator between said states. The second optical switch comprises four optical ports, a first optical waveguide, a first switch element and a second switch element. The first optical waveguide is coupled between a first of said optical ports and a second of said optical ports. The first switch element is provided between the first optical waveguide and a second optical waveguide. The second optical waveguide is coupled to a third of said optical ports. The second switch element is provided between the first optical waveguide and a third optical waveguide. The third optical waveguide is coupled to a fourth of said optical ports. Each said switch element comprises a micro-ring resonator having an active state and an inactive state. In the active state, the micro-ring resonation is coupled to the first waveguide and to a respective one of the second and third waveguides for optical signals at a preselected wavelength. In the inactive state no coupling occurs. Each switch element comprises a control element arranged to receive a respective control signal configured to cause it to switch the micro-ring resonator between said states. The second optical switch further comprises a fourth waveguide, a third said switch element, a fourth said switch element and optical modulation apparatus. The fourth waveguide is coupled between the third and fourth optical ports. The third switch element is provided between the second and fourth optical waveguides. The fourth switch element is provided between the third and fourth optical waveguides. The micro-ring resonators of the third and fourth switch elements in their active states being coupled to the fourth waveguide and a respective one of the second and third waveguides. The optical modulation apparatus is arranged to modulate optical signals coupled into the second and third optical waveguides. The first and second photodetectors are coupled to the third and fourth optical ports respectively of the first optical switch. Each photodetector has an output coupled to a respective input of the electrical cross-point switch matrix. The modulation driver is arranged to receive a communication signal from the electrical cross-point switch. The modulation driver is arranged to generate and transmit modulation signals to the modulation apparatus.

The modulation apparatus may enable each optical switch to perform modulation of remotely distributed optical carriers or remodulation of received downstream optical signals to thereby enable the network to support wavelength reuse. The modulation driver may enable flexible connection of signals to be added to any of the switch elements from the electrical cross-point switch matrix. The node may therefore have 'colourless' add operation.

In an embodiment, the optical modulation apparatus comprises a micro-ring modulator coupled to the second optical waveguide and coupled to the third optical waveguide. The micro-ring modulator is arranged to receive a respective modulation signal arranged to cause it to apply a respective modulation to an optical signal in either of the second and third optical waveguide.

In an embodiment, the optical modulation apparatus comprises a first micro-ring modulator coupled to the second optical waveguide and a second micro-ring modulator coupled to the third optical waveguide. Each micro-ring modulator is arranged to receive a respective modulation signal arranged to cause it to apply a respective modulation to a respective optical signal. The micro-ring modulators may be used to modulate or re-modulate an optical signal switched from the first waveguide or the fourth waveguide by a respective one of the switch elements, the optical signals propagating through the respective waveguide in either direction.

In an embodiment, the optical modulation apparatus comprises the micro-ring resonator of one of the first and third switch elements and the micro-ring resonator of one of the second and fourth switch elements. The micro-ring resonators may be used both to couple optical signals and to modulate or re-modulate a respective optical signal switched from the first waveguide or the fourth waveguide by a respective one of the switch elements, the optical signals propagating through the respective waveguide in either direction.

In an embodiment, the optical switching apparatus comprises a plurality of said first optical switches, a plurality of photodetectors, and a plurality of said second optical switches. Each photodetector is coupled to a respective port of a respective first optical switch and each photodetector has an output coupled to a respective input of the electrical cross-point switch matrix. The second optical switches share the same fourth waveguide. The network may support remote carrier distribution, and may receive carrier optical signals from two opposite directions.

In an embodiment, the optical switching apparatus comprises a further plurality of said first optical switches and a further plurality of said photodetectors. Each said first optical switch comprises first and second switch elements provided between the fourth waveguide and the respective second and third waveguide. The photodetectors are each coupled to a respective port of the respective first optical switch and the photodetectors each have an output coupled to a respective input of the electrical cross-point switch matrix. The node may support remote carrier distribution from either of the first and fourth optical waveguide, and may receive carrier optical signals from both, opposing, directions of the waveguides. The network may therefore support protection switching, enabling remote carrier distribution to be changed from the internal optical fibre ring to the external optical fibre ring or to be changed from one direction to the opposing direction within the same optical fibre ring.

In an embodiment, said optical switches each comprise four optical ports, a first optical waveguide, a first switch element and a second switch element. The first optical waveguide is coupled between a first of said optical ports and a second of said optical ports. The first switch element is provided between the first optical waveguide and a second optical waveguide. The second optical waveguide is coupled to a third of said optical ports. The second switch element is provided between the first optical waveguide and a third optical waveguide. The third optical waveguide is coupled to a fourth of said optical ports. Each said switch element comprises a micro-ring resonator having an active state and an inactive state. In the active state, the micro-ring resonation is coupled to the first waveguide and to a respective one of the second and third waveguides for optical signals at a preselected wavelength. In the inactive state no coupling occurs. Each switch element comprises a control element arranged to receive a respective control signal configured to cause it to switch the micro-ring resonator between said states. Each optical switch further comprises a fourth waveguide, a third said switch element, a fourth said switch element and optical modulation apparatus. The fourth waveguide is coupled between the third and fourth optical ports. The third switch element is provided between the second and fourth optical waveguides. The fourth switch element is provided between the third and fourth optical waveguides. The micro-ring resonators of the third and fourth switch elements in their active states being coupled to the fourth waveguide and a respective one of the second and third waveguides. The optical modulation apparatus is arranged to modulate optical signals coupled into the second and third optical waveguides. Each optical switch shares the same fourth waveguide. The optical switching apparatus further comprises a plurality of optical splitters, demodulation apparatus, a plurality of photodetectors and a modulation driver. The demodulation apparatus is coupled to the second and third waveguide of each optical switch. Each photodetector is coupled to the demodulation apparatus and each photodetector has an output coupled to a respective input of the electrical cross-point switch matrix. The modulation driver is arranged to receive a communication signal from the electrical cross-point switch and arranged to generate and transmit modulation signals to the modulation apparatus.

The node may support wavelength reuse, allowing downstream optical signals to be both detected and remodulated for upsteam transmission, and may receive downstream optical signals from two opposite directions, for remodulation and upstream transmission. The node may therefore support protection switching within the network, enabling the direction of transmission of downstream signals to be changed from one direction to the opposing direction of the respective optical fibre ring, while still enabling remodulation for upstream transmission.

The demodulation apparatus comprises a plurality of demodulators. Each demodulator is coupled to the second and third waveguide of the respective optical switch. Each photodetector is coupled to a respective demodulation apparatus.

Embodiments of the invention will now be described, by way of example only, with reference to the accompanying drawings.

DETAILED DESCRIPTION

Figure 1:
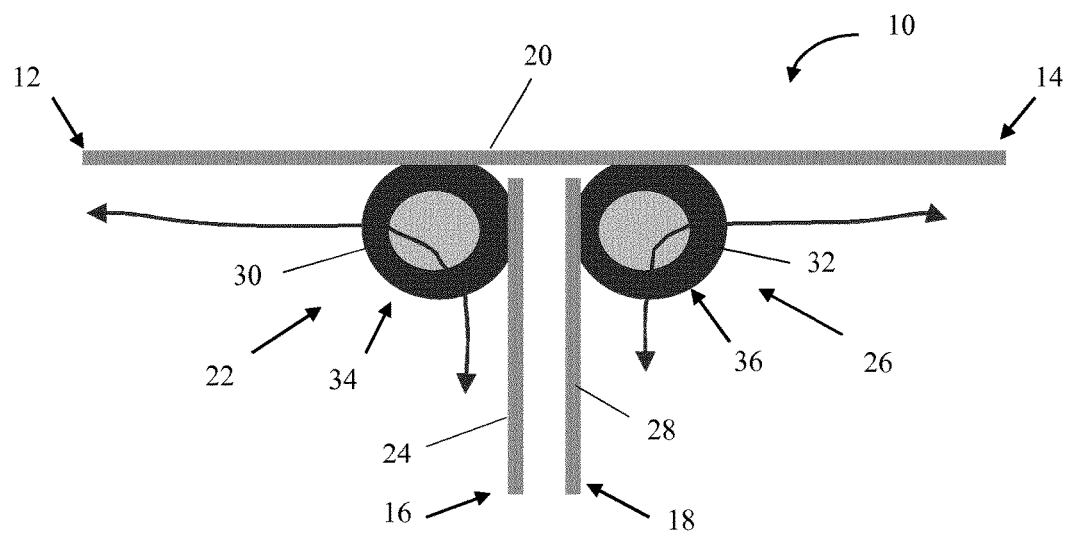
FIG. 1 is a diagrammatic representation of an optical switch according to a first embodiment of the invention.

Referring to FIG. 1, a first embodiment of the invention provides an optical switch 10 comprising first, second, third and fourth optical ports 12, 14, 16, 18, a first optical waveguide 20, a first switch element 22, and a second switch element 26.

The first optical waveguide 20 is coupled between the first optical port 12 and the second optical port 14.

The first switch element 22 is provided between the first optical waveguide 20 and a second optical waveguide 24 that is coupled to the third optical port 16. The second switch element 26 is provided between the first optical waveguide and a third optical waveguide 28 that is coupled to the fourth optical ports 18.

Each of the switch elements 22, 26 comprises a micro-ring resonator 30, 32 and a control element 34, 36. Each micro-ring resonator has an active state, in which it is coupled to the first waveguide and to a respective one of the second and third waveguides for optical signals at a preselected wavelength, and an inactive state in which no coupling occurs. Each switch element is configured only to operate on optical signals of a preselected wavelength, and is therefore has 'coloured' operation, and is able to add/drop or bypass optical signals of the same wavelength coming from opposite directions, as indicated by the arrows in the Figure. The first switch element 22 can drop optical signals at the preselected wavelength coming from the West direction (as orientated in the Figure) and can add optical signals at the same wavelength for transmission to the West. The second switch element 26 can drop optical signals at the preselected wavelength coming from the East direction (as orientated in the Figure) and can add optical signals at the same wavelength for transmission to the East.

The control elements 34, 36 are each arranged to receive a respective control signal configured to cause it to switch the micro-ring resonator between the active and inactive states. In this example the control elements are heaters and the control signal supplies current to the respective heater to activate the micro-ring resonator.

Figure 2:
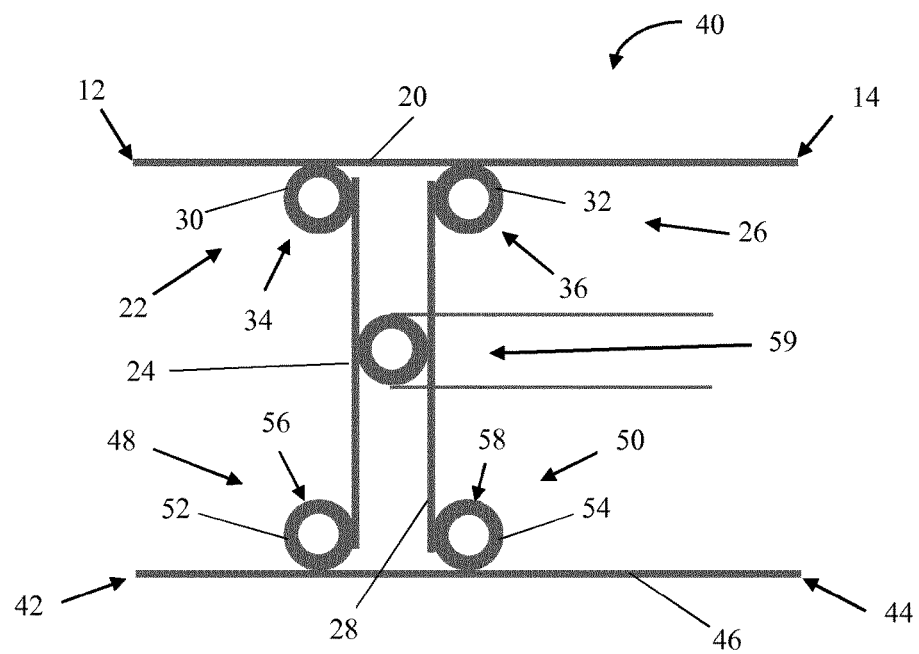
FIG. 2 is a diagrammatic representation of an optical switch according to a second embodiment of the invention.

A second embodiment of the invention provides an optical switch 40 as shown in FIG. 2. The optical switch 40 of this embodiment is similar to the optical switch 10 of FIG. 1, with the following modifications. The same reference numbers are retained for corresponding features.

The optical switch 40 additionally comprises a fourth waveguide 46, a third switch element 48, a fourth switch element 50 and optical modulation apparatus 59.

The fourth waveguide 46 is coupled between the third and fourth optical ports 42, 44 of this embodiment.

The third and fourth switch elements 48, 50 have the same structure as the first and second switch elements 22, 26, each comprising a micro-ring resonator 52, 54 and a control element 56, 58. The third switch element 48 is provided between the second optical waveguide 24 and the fourth optical waveguide 46. In its active state, the micro-ring resonator 52 of the third switch element 48 is coupled to the second waveguide and to the fourth waveguide for optical signals at the preselected wavelength. The fourth switch element 50 is provided between the third optical waveguide 28 and the fourth optical waveguide 46. In its active state, the micro-ring resonator 54 of the fourth switch element 50 is coupled to the third waveguide and to the fourth waveguide for optical signals at the preselected wavelength.

The optical modulation apparatus 59 is arranged to modulate optical signals coupled into either of the second and third optical waveguides. In this embodiment, the optical modulation apparatus comprises a first micro-ring modulator, MRM, 59. The MRM is arranged to receive a respective electrical modulation signal arranged to cause it to apply a respective modulation to an optical signal propagating in either of the second and third waveguides. The MRM 59 may be used to modulate an optical carrier signal or to remodulate a downstream optical signal, received from say the first optical waveguide, from either East or West, for upstream transmission to East or West on the fourth optical waveguide, or vice versa.

Figure 3:
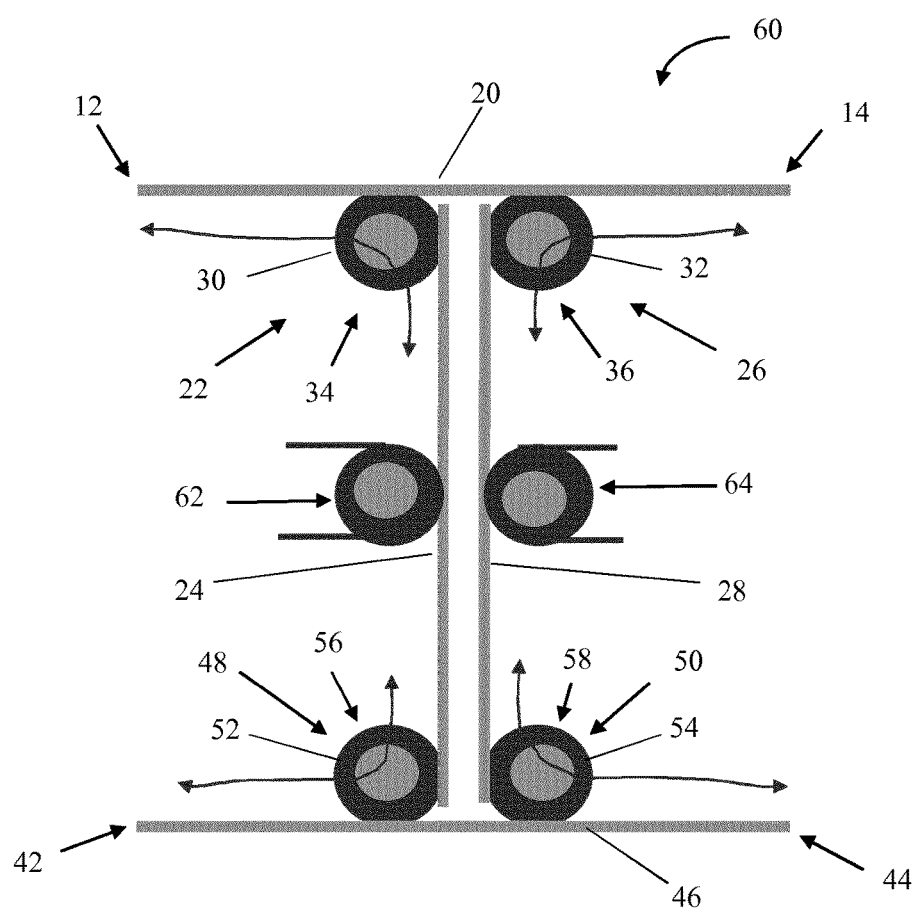
FIG. 3 is a diagrammatic representation of an optical switch according to a third embodiment of the invention.

A third embodiment of the invention provides an optical switch 60 as shown in FIG. 3. The optical switch 60 of this embodiment is similar to the optical switch 40 of FIG. 2, with the following modifications. The same reference numbers are retained for corresponding features.

In this embodiment, the optical modulation apparatus comprises a first micro-ring modulator, MRM, 62 coupled to the second optical waveguide and a second MRM 64 coupled to the third optical waveguide. Each MRM is arranged to receive a respective electrical modulation signal arranged to cause it to apply a respective modulation to an optical signal propagating in its respective waveguide. The MRMs 62, 64 may be used to modulate an optical carrier signal or to remodulate a downstream optical signal, received from say the first optical waveguide, from either East or West, for upstream transmission to East or West on the fourth optical waveguide, or vice versa.

Figure 4:
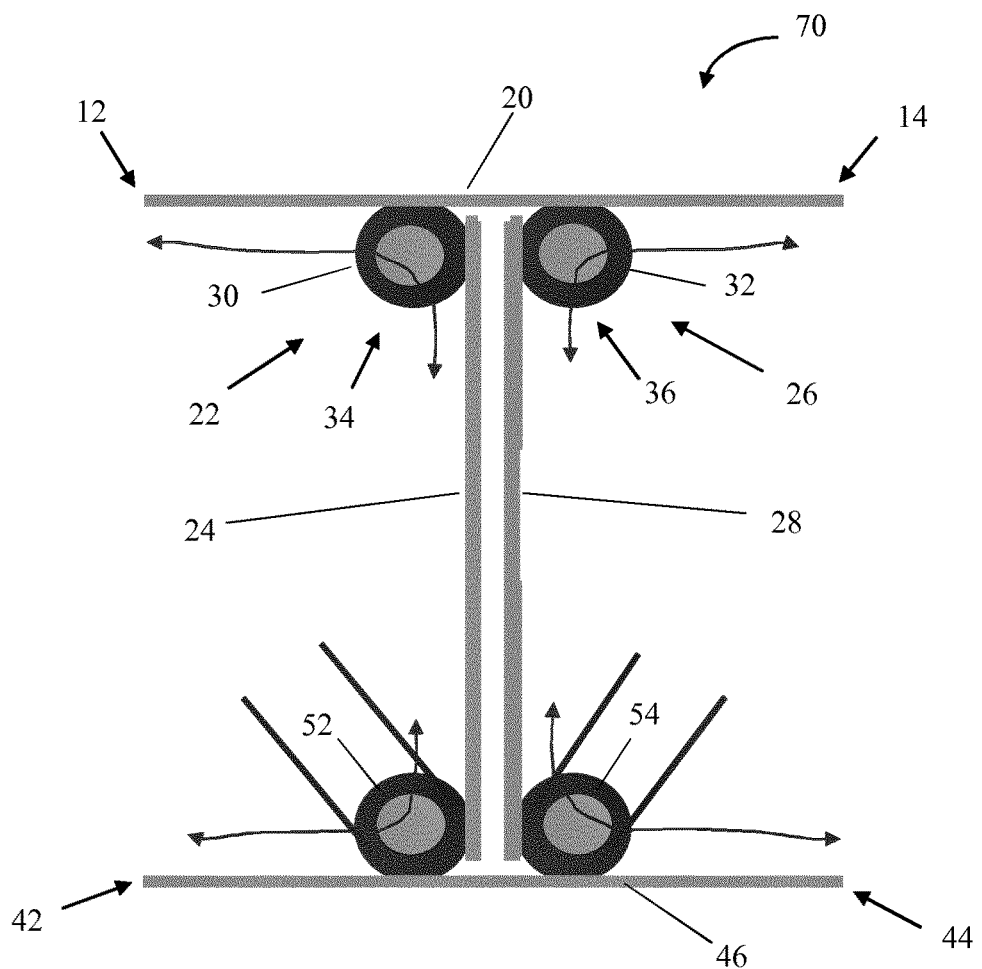
FIG. 4 is a diagrammatic representation of an optical switch according to a fourth embodiment of the invention.

A fourth embodiment of the invention provides an optical switch 70 as shown in FIG. 4. The optical switch 70 of this embodiment is similar to the optical switches 40, 60 of FIGS. 2 and 3, with the following modifications. The same reference numbers are retained for corresponding features.

In this embodiment, the modulation function is performed by the micro-ring resonators 30, 32, 52, 54 as they couple optical signals from the second or third waveguide 24, 28 into either the first or fourth waveguide. The micro-ring resonators 52, 54 of the third and fourth optical switches are shown configured as the optical modulation apparatus but it will be appreciated that the micro-ring resonators 30, 32 of the first and second optical switches 22, 26 may alternatively or additionally be configured as the optical modulation apparatus.

Figure 5:
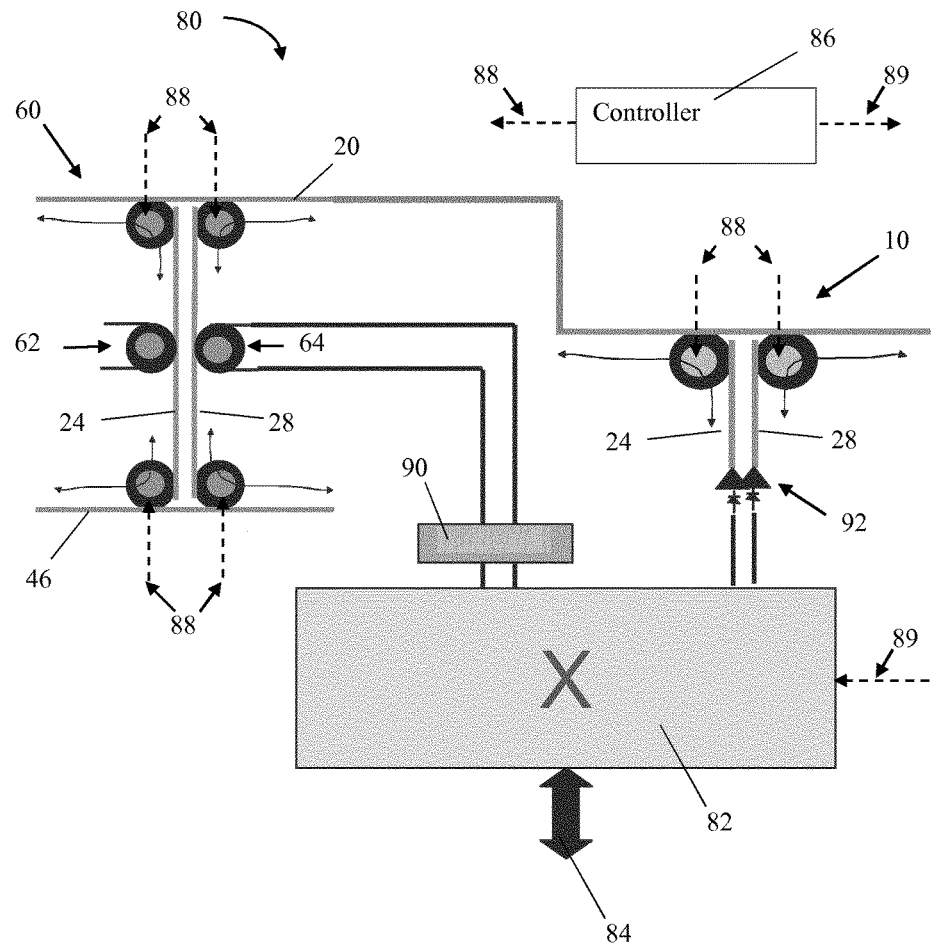
FIG. 5 is a diagrammatic representation of optical switching apparatus according to a fifth embodiment of the invention.

FIG. 5 shows optical switching apparatus 80 according to a fifth embodiment of the invention. The optical switching apparatus comprises a plurality of optical switches 10, 60, an electrical cross-point switch matrix 82 and a controller 86.

The plurality of optical switches comprises a plurality of first optical switches 10, as shown in FIG. 1, and a plurality of second optical switches 60, as shown in FIG. 3. Only one of each optical switch 10, 60 is shown for clarity. The optical switches 10, 60 share the same first optical waveguide 20 and each has its own respective second and third waveguide 24, 28. The second optical switches 60 share the same fourth optical waveguide 46. The third and fourth optical ports of the first optical switch 10 are each coupled to a photodetector 92. Each photodetector has an output which is coupled to a respective input of the electrical cross-point switch matrix 82.

The electrical cross-point switch matrix 82 is arranged to receive communication signals 84 from a communication network. The controller 86 is arranged to generate and transmit control signals 88 to the switch elements of the optical switches 10, 60, to cause them to switch between their inactive and active states, and to generate and transmit a configuration signal 89 to the electrical cross-point switch matrix 82 comprising instructions to configure the electrical cross-point switch matrix according to the received communication signals.

The optical switching apparatus further comprises a modulation driver 90 coupled between the electrical cross-point switch matrix 82 and the MRMs 60, 62 of the second optical switch 40. The modulation driver 90 is arranged to receive a communication signal from the electrical cross-point switch and is arranged to generate and transmit modulation signals having an appropriate voltage and current to the MRMs.

The micro-ring resonators 30, 32 of each first optical switch 10 are configured to couple optical signals of a different preselected one of a plurality of wavelengths.

Downstream optical signals to be dropped from the first optical waveguide 20 are coupled into the second or third optical waveguide 24, 28 of the first optical switch 10, operating at the respective wavelength, depending on whether the optical signals arrive from the West or the East respectively. The optical signals are then converted into corresponding electrical signals by the photodetectors 92 and output to the electrical cross-point switch matrix 82.

The micro-ring resonators 30, 32, 52, 54 of each second optical switch 60 are configured to couple optical signals of a different preselected one of the plurality of wavelengths. Communication signals received by the electrical cross-point switch matrix 82 from the communication network 84 are added as upstream optical signals by the respective MRM 62, 64 of the respective second optical switch applying a corresponding modulation to an optical carrier signal at the respective preselected wavelength. The modulation optical signal is then coupled into the first or fourth optical waveguide 20, 46 by the respective switch element.

Each optical switch 10, 60 of the optical switching apparatus 80 is colour-coded, only acting on optical signals of its respective preselected wavelength. The electrical cross-point switch matrix 82 enables flexible connection of communication signals to be added and dropped to any of the colour-coded optical switches, adding flexibility to the optical switching apparatus and giving it 'colourless' operation.

It will be appreciated that one or more of the second optical switches 60 may alternatively be an optical switch 40 as shown in FIG. 2 or an optical switch 70 as shown in FIG. 4.

Figure 6:
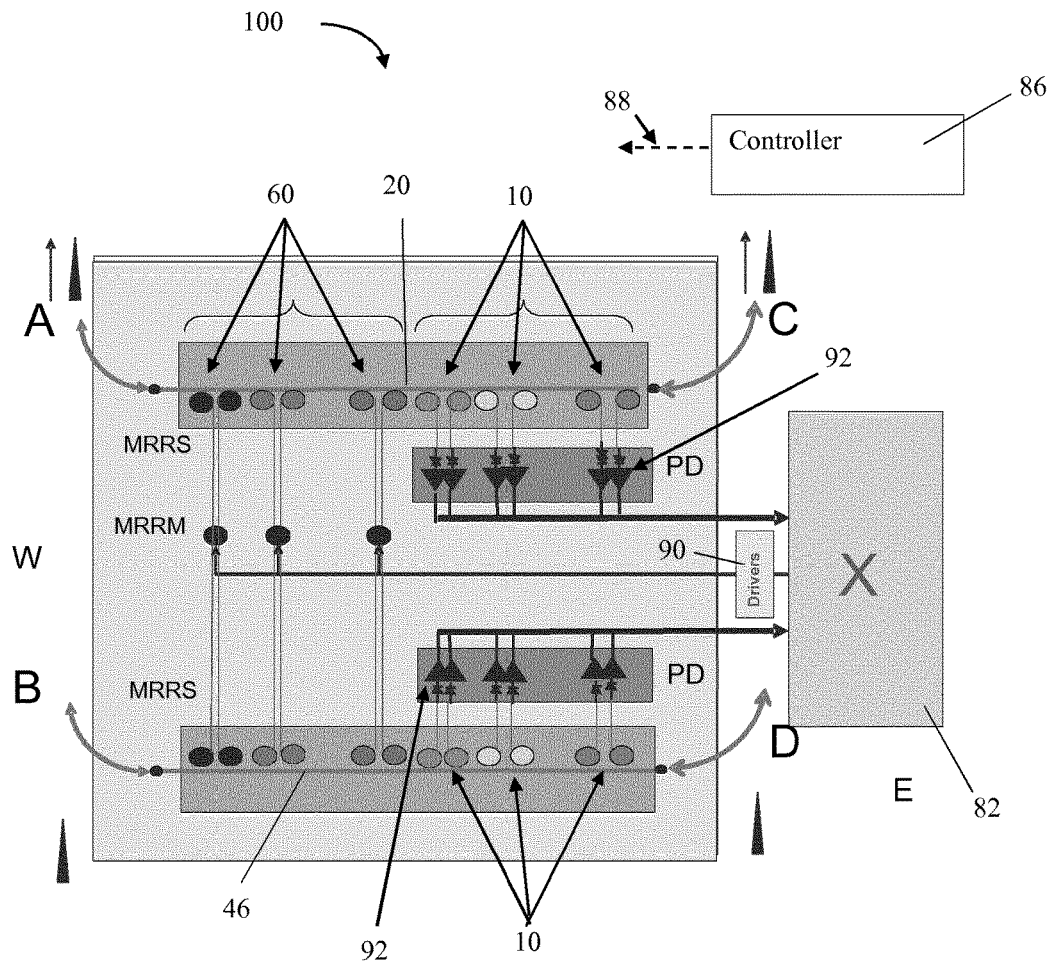
FIG. 6 is a diagrammatic representation of optical switching apparatus according to a sixth embodiment of the invention.

Optical switching apparatus 100 according to a sixth embodiment of the invention is shown in FIG. 6. The apparatus 100 of this embodiment is similar to the apparatus 80 of FIG. 5 with the following modifications. The same reference numbers are retained for corresponding features.

The optical switching apparatus 100 of this embodiment comprises a further plurality of first optical switches 10, each comprising a first switch element 22, provided between the fourth optical waveguide 46 and its respective second optical waveguide 24, and a second switch element 26, provided between the fourth waveguide 46 and its respective third optical waveguide 28. A further plurality of photodetectors 92 are also provided, each coupled to a respective optical port coupled to the second or third optical waveguide 24, 28 of a respective first optical switch. The output of each photodetector is coupled to a respective input of the electrical cross-point switch matrix 82.

The first optical waveguide 20 extends between a first optical port A and a second optical port C. The fourth optical waveguide 46 extends between a third optical port B and a fourth optical port D.

The first optical switches 10 having their switch elements 22, 26 provided between the fourth optical waveguide 46 and a respective second or third optical waveguide 24, 28 enable the optical switching apparatus 100 additionally to drop downstream optical signals received from West (port B) or East (port D) on the fourth optical waveguide 46.

Each of the ports A, B, C, D is therefore bidirectional, being able to receive downstream optical signals from the West (ports A and B) or the East (ports C and D) and being able to output upstream optical signals to the West or to the East.

The optical switching apparatus 100 supports remote carrier distribution within an optical communication network. Downstream optical signals, each having a different one of a set of downstream wavelengths, are received at port A together with a plurality of optical carrier signals, each having a different one of a set of upstream wavelengths. The optical signals propagate through the first optical waveguide 20 where one or more of the optical carrier signals to be used for upstream communication are coupled out of the first optical waveguide by activating the micro-ring resonators of the second optical switches 60 of the respective wavelengths. By activating the respective second optical switches 60, the optical carrier signals are removed from the first optical waveguide and coupled into the respective second or third optical waveguide, for modulation by the respective MRM 60, 62. Electrical communication signals are received by the electrical cross-point switch matrix 82, which provides flexibility in selecting the upstream wavelengths that will transport the signals, and are sent to the modulation driver 90 to provide the right current and voltage level modulation signals for the MRMs 60, 62. The modulated upstream optical signals are then multiplexed with express optical signals, at other wavelengths, propagating in the fourth optical waveguide 46, by the switch elements of the respective second optical switches 60. The optical carrier signals which not coupled out of the first optical waveguide 20 (by not activating the second optical switches 60 corresponding to their respective wavelengths) propagate through the first optical waveguide 20 to the second port C.

Downstream optical signals which are to be dropped are coupled out of the first optical waveguide 20 by the respective first optical switch and are converted to electrical signals by the respective photodiodes 92 before regeneration. The regenerated signals are then routed by the electrical cross-point switch matrix to be output to a further communication network (not shown).

Figure 7:
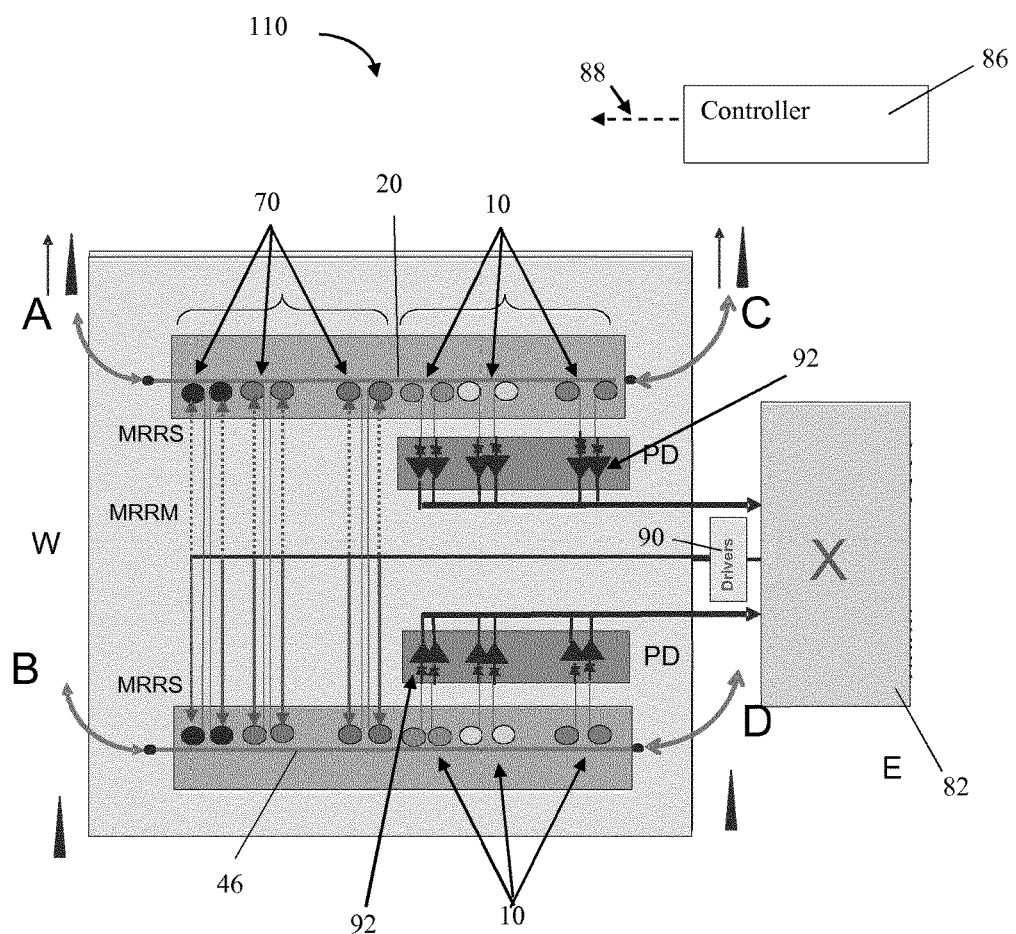
FIG. 7 is a diagrammatic representation of optical switching apparatus according to a seventh embodiment of the invention.

Optical switching apparatus 110 according to a seventh embodiment of the invention is shown in FIG. 7. The apparatus 110 of this embodiment is similar to the apparatus 100 of FIG. 6 with the following modifications. The same reference numbers are retained for corresponding features.

In this embodiment, the second optical switches 70 have the structure shown in FIG. 4.

Figure 8:
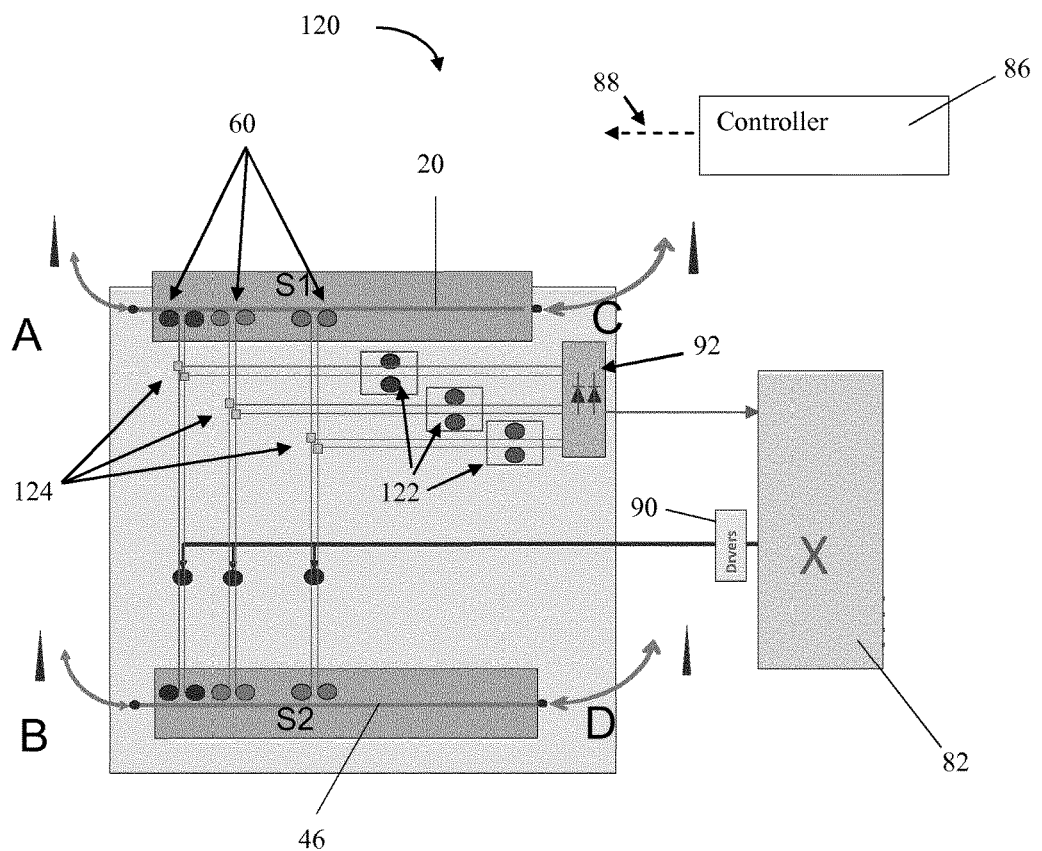
FIG. 8 is a diagrammatic representation of optical switching apparatus according to an eighth embodiment of the invention.

Optical switching apparatus 120 according to an eighth embodiment of the invention is shown in FIG. 8. The apparatus 120 of this embodiment is similar to the apparatus 80 of FIG. 5 with the following modifications. The same reference numbers are retained for corresponding features.

In this embodiment, all of the optical switches 60 have the structure shown in FIG. 3. The apparatus 100 further comprises a plurality of optical splitters 124 and a plurality of demodulation apparatus 122. Each demodulation apparatus 122 is coupled to the second and third waveguide of each optical switch by respective optical splitters 124. Each demodulation apparatus 122 comprises a micro-ring resonator configured to act as a filter to perform frequency modulation-amplitude modulation, FM-AM, conversion.

Each optical splitter 124 is a 1:2 splitter configured to distribute one copy of the respective downstream optical signal to the respective demodulator and another copy to the respective MRM 62, 64 for remodulation for upstream transmission.

The photodetectors 92 are each coupled to a respective demodulation apparatus and each have an output coupled to a respective input of the electrical cross-point switch matrix 82.

Figure 9:
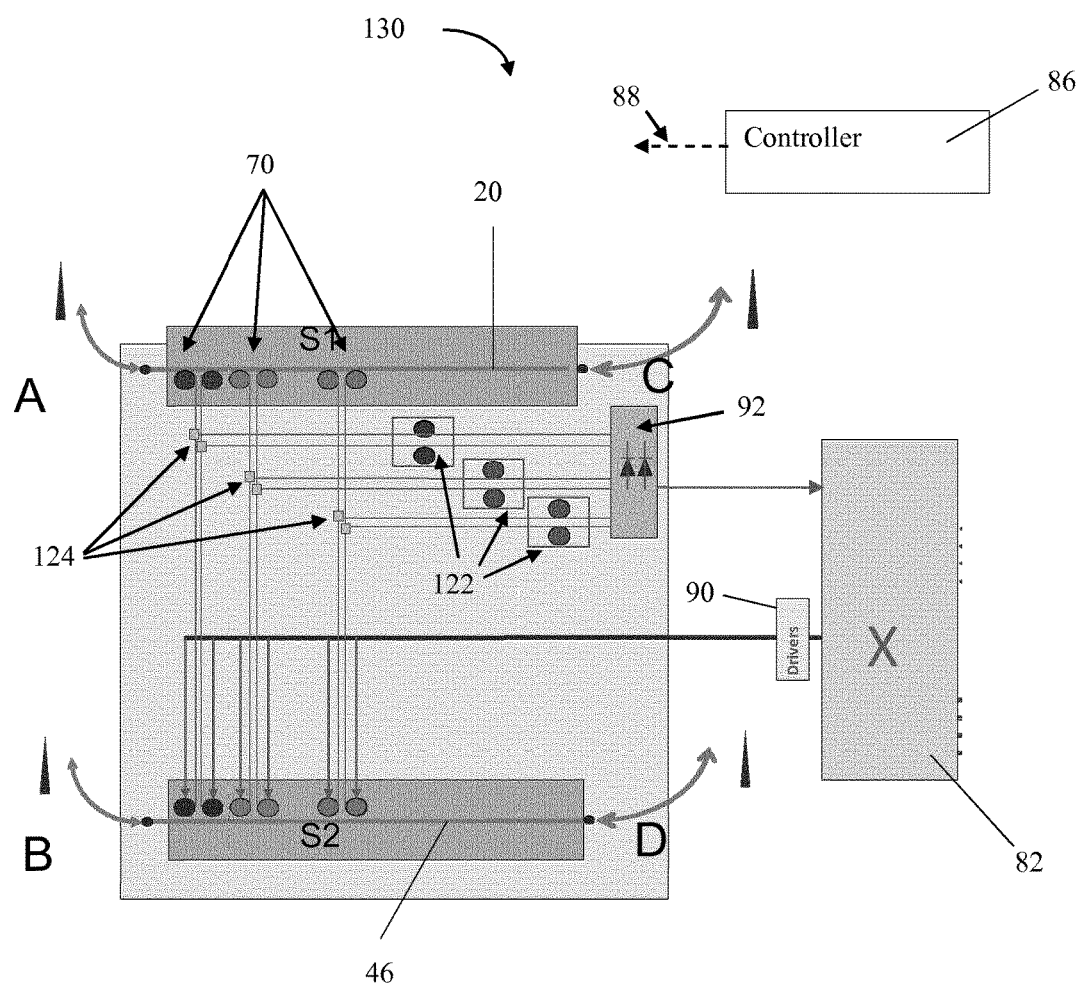
FIG. 9 is a diagrammatic representation of optical switching apparatus according to a ninth embodiment of the invention.

Optical switching apparatus 130 according to a ninth embodiment of the invention is shown in FIG. 9. The apparatus 130 of this embodiment is similar to the apparatus 120 of FIG. 8 with the following modifications. The same reference numbers are retained for corresponding features.

In this embodiment, the optical switches 70 have the structure shown in FIG. 4.

Figure 10:
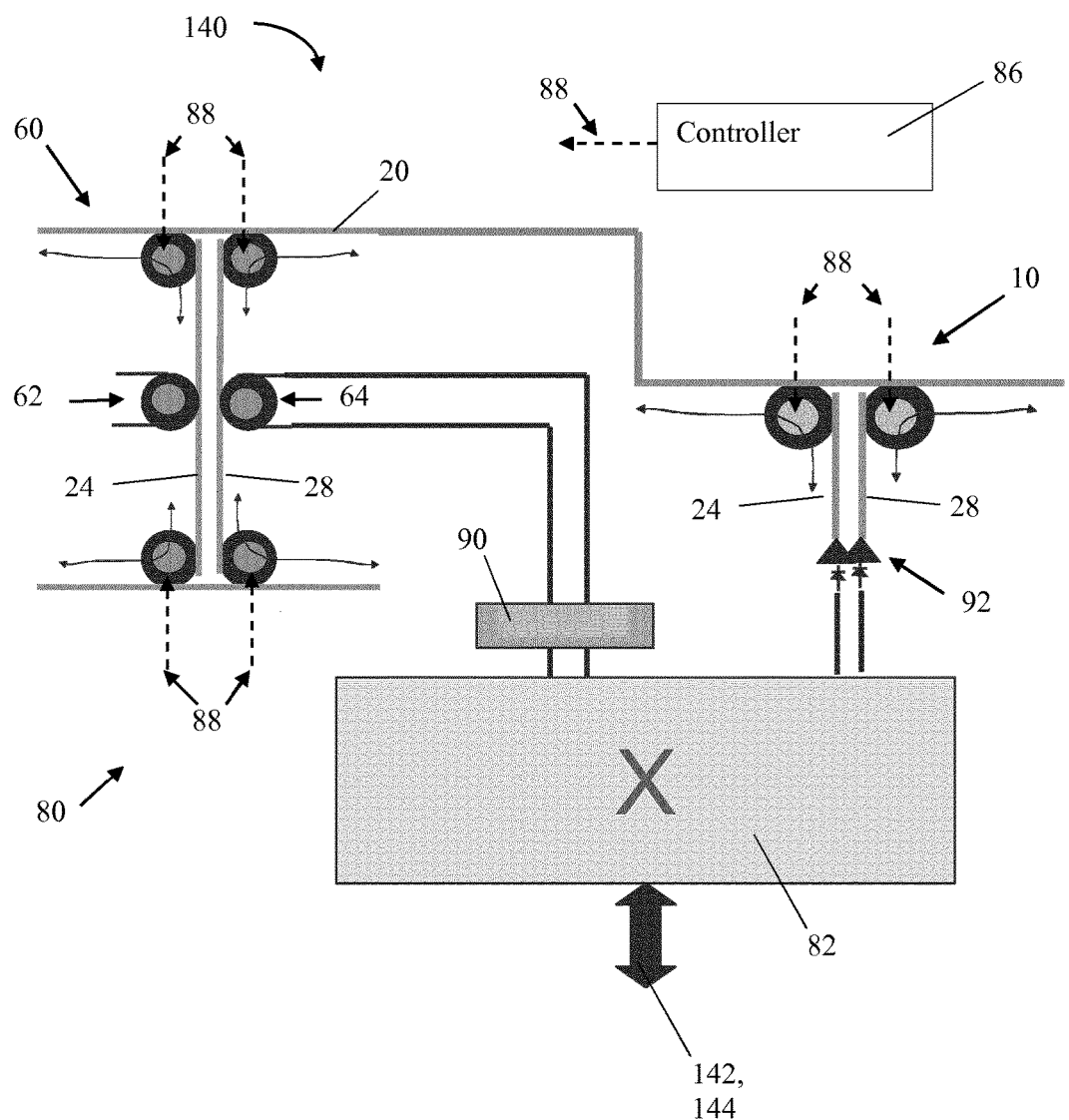
FIG. 10 is a diagrammatic representation of communication network switching node according to a tenth embodiment of the invention.

A tenth embodiment of the invention provides a communication network switching node 140 as shown in FIG. 10. The node 140 comprises optical switching apparatus 80, as shown in FIG. 5, optical to electrical, O-E, signal conversion apparatus 142 and electrical to optical, E-O, signal conversion apparatus 144.

The optical ports of the optical switching apparatus 80 are arranged to couple the first optical waveguide 20 and the fourth optical waveguide 46 to a first optical communication network.

The O-E conversion apparatus 142 is coupled to the electrical cross-point switch matrix 82 and is arranged to receive optical signals from a second optical communication network. The E-O conversion apparatus 144 is coupled to the electrical cross-point switch matrix and is arranged to output optical signals to the second optical communication network.

Figure 11:
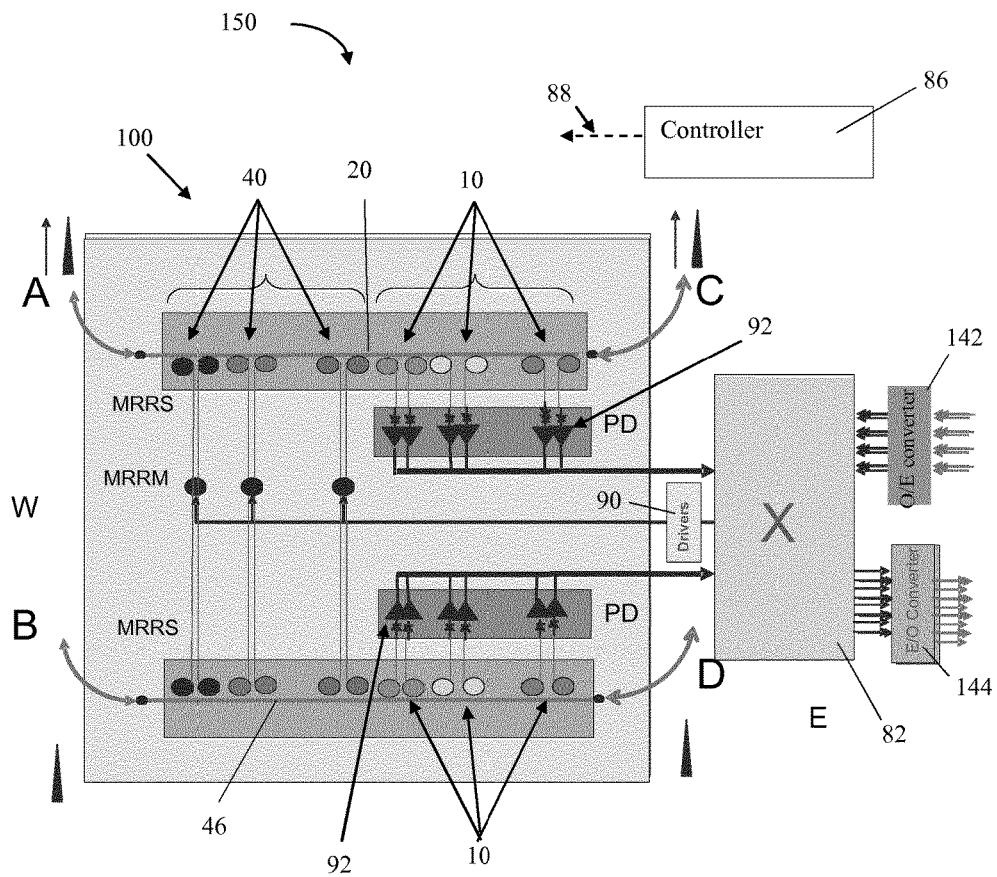
FIG. 11 is a diagrammatic representation of communication network switching node according to an eleventh embodiment of the invention.

FIG. 11 shows provides a communication network switching node 150 according to an eleventh embodiment of the invention. The node 150 of this embodiment is similar to the node 140 of FIG. 10, with the following modifications. The same reference numbers are retained for corresponding features.

In this embodiment, the node 150 comprises optical switching apparatus 100 as shown in FIG. 6.

The first optical communication network is a high radio access network, High-RAN, and the second optical communication network is a low radio access network, Low-RAN.

Figure 12:
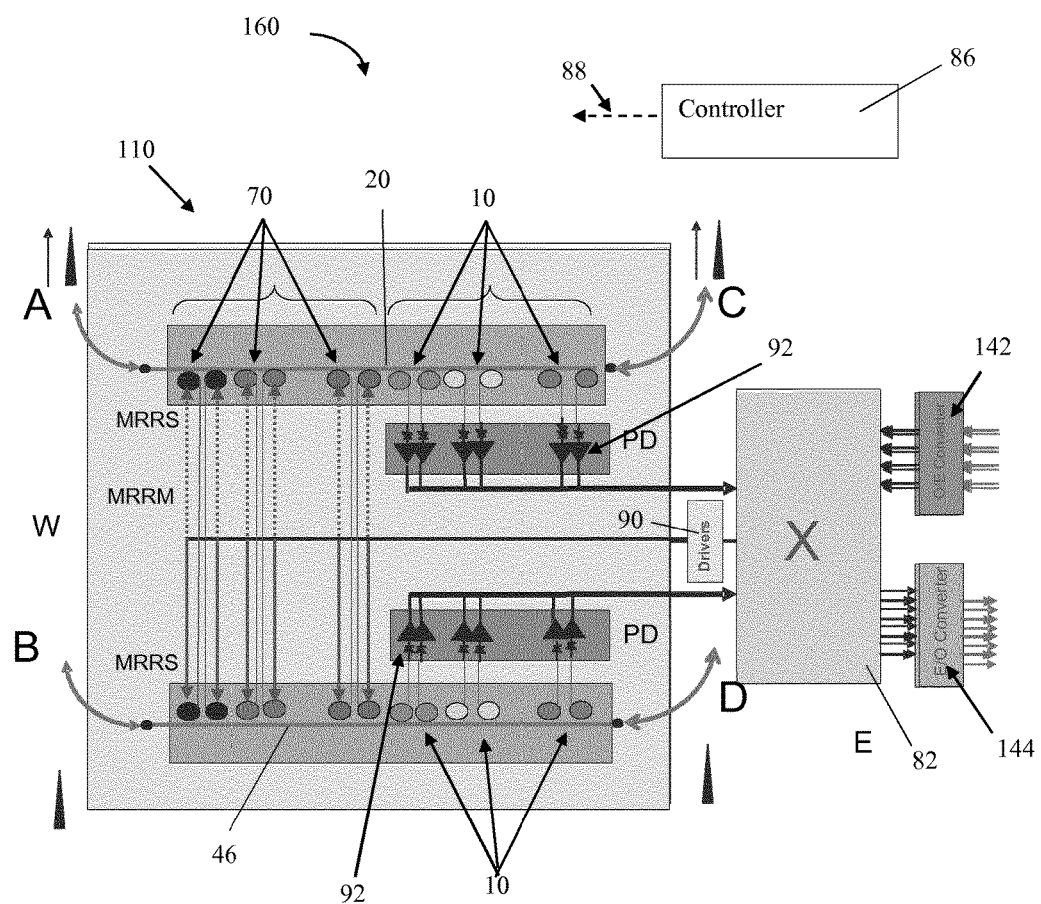
FIG. 12 is a diagrammatic representation of communication network switching node according to a twelfth embodiment of the invention.

FIG. 12 shows provides a communication network switching node 160 according to an eleventh embodiment of the invention. The node 160 of this embodiment is similar to the node 150 of FIG. 11, with the following modifications. The same reference numbers are retained for corresponding features.

In this embodiment, the node 160 comprises optical switching apparatus 110 as shown in FIG. 7.

Figure 13:
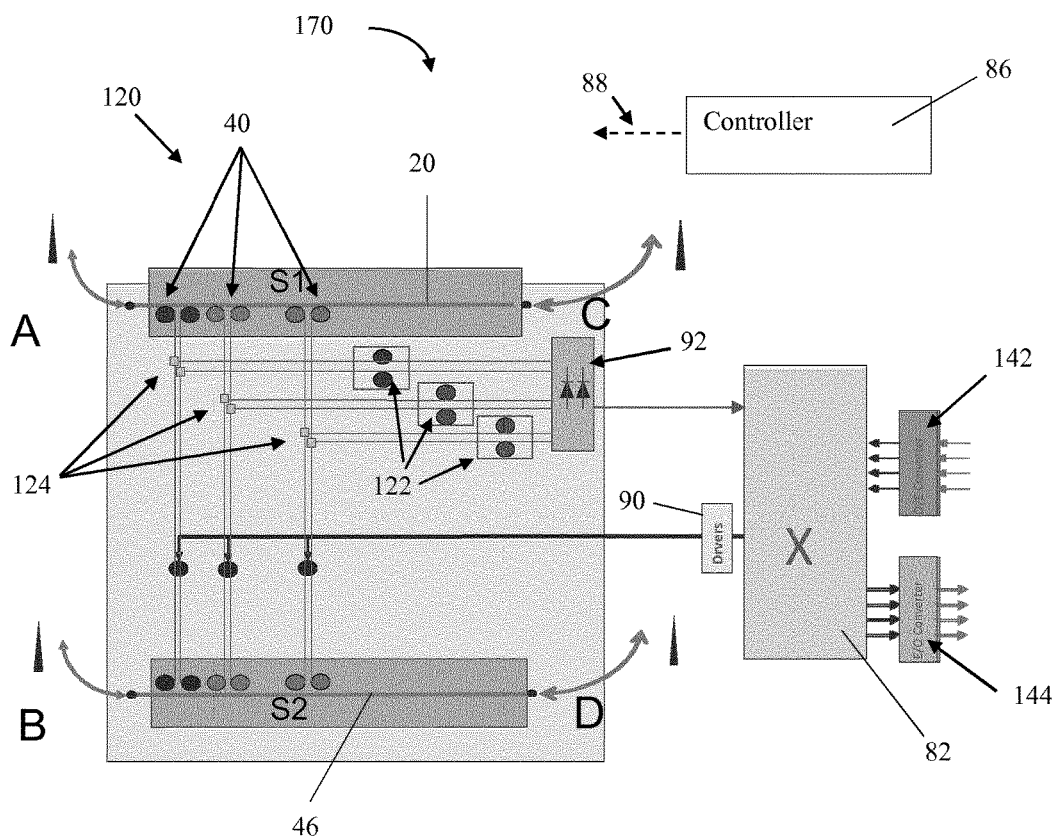
FIG. 13 is a diagrammatic representation of communication network switching node according to a thirteenth embodiment of the invention.

FIG. 13 shows provides a communication network switching node 170 according to a thirteenth embodiment of the invention. The node 170 of this embodiment is similar to the node 150 of FIG. 11, with the following modifications. The same reference numbers are retained for corresponding features.

In this embodiment, the node 170 comprises optical switching apparatus 120 as shown in FIG. 8.

Figure 14:
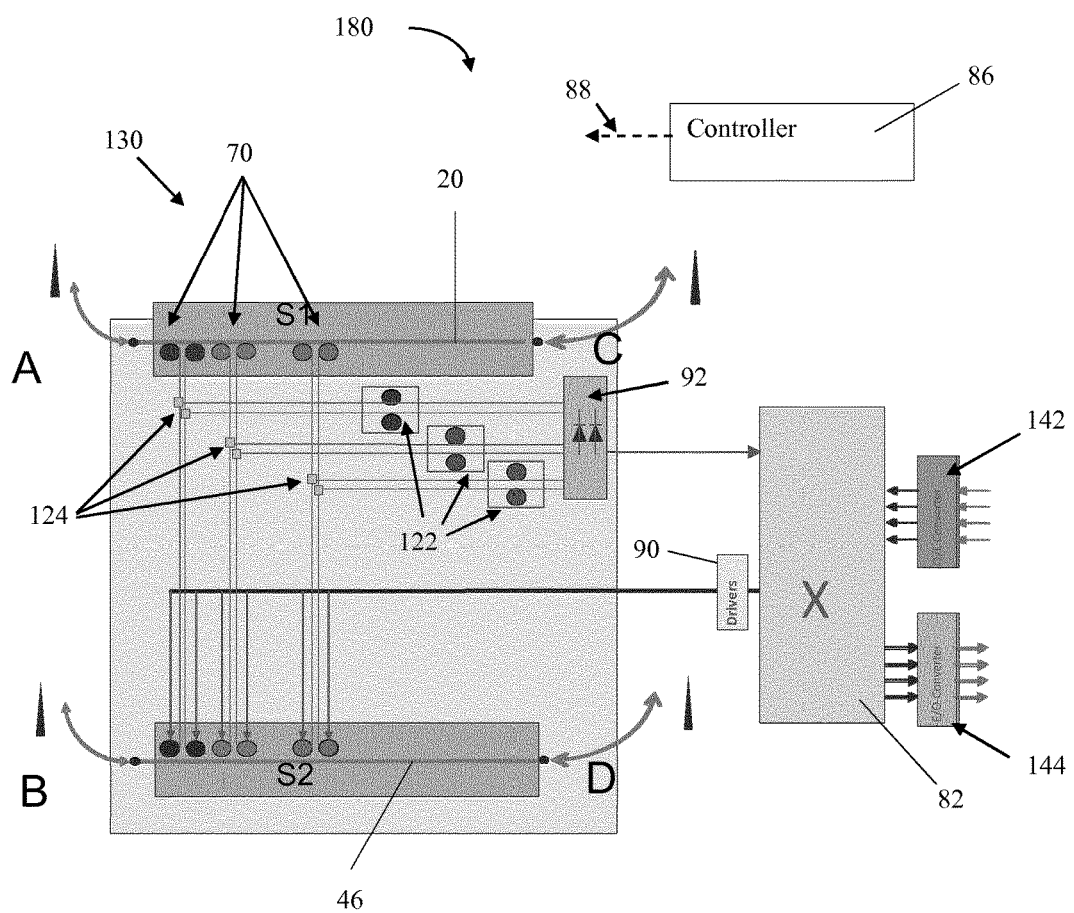
FIG. 14 is a diagrammatic representation of communication network switching node according to a fourteenth embodiment of the invention.

FIG. 14 shows a communication network switching node 180 according to a fourteenth embodiment of the invention. The node 180 of this embodiment is similar to the node 150 of FIG. 11, with the following modifications. The same reference numbers are retained for corresponding features.

In this embodiment, the node 180 comprises optical switching apparatus 130 as shown in FIG. 9.

In this embodiment, all optical add-drop and modulation function are integrated in a single mini-ROADM based on low cost Silicon Photonic technology. This node could be entirely implemented with photonic integrated devices and in particular silicon photonics devices.

Figure 15:
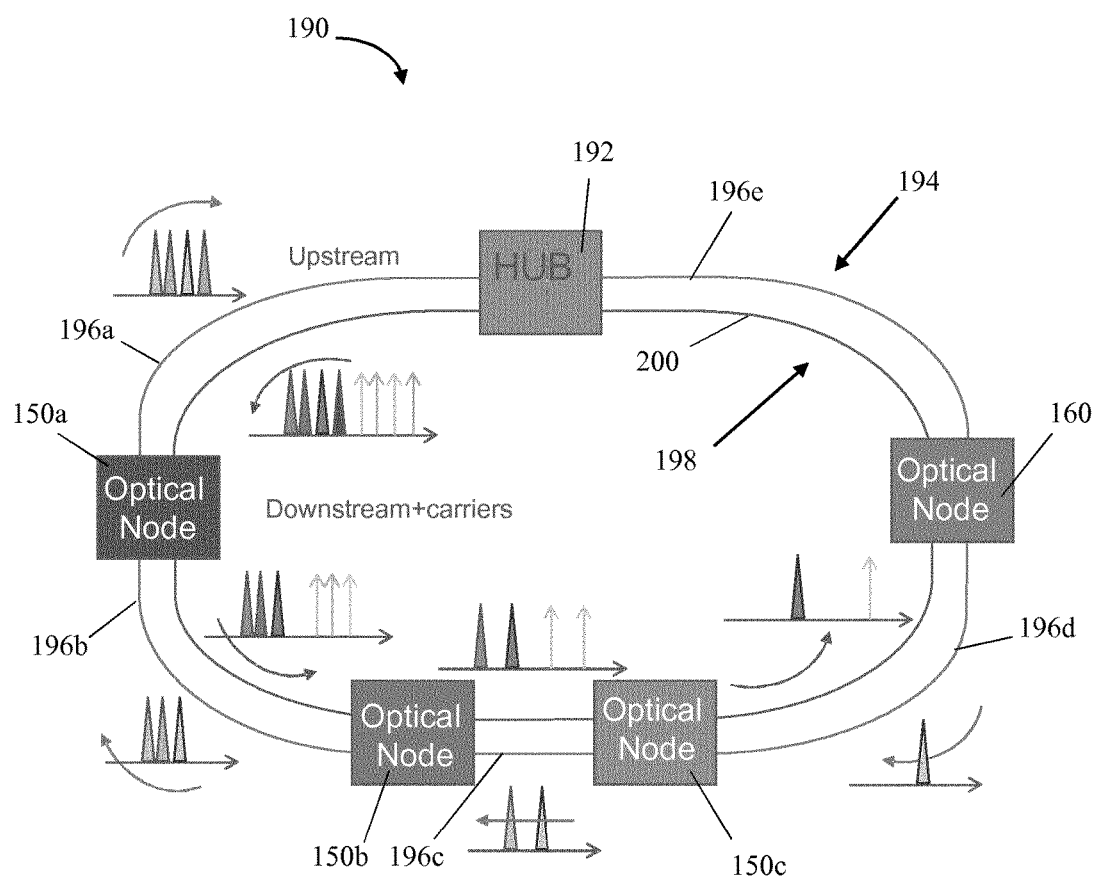
FIG. 15 is a diagrammatic representation of communication network according to a fifteenth embodiment of the invention.

A fifteenth embodiment of the invention provides a communication network 190 as shown in FIG. 15. The network comprises a hub node 192, a plurality of communication network switching nodes 150, 160, an internal optical fibre ring 194 and an external optical fibre ring 198.

The nodes have the structure shown in FIGS. 11 and 12.

The internal optical fibre ring 194 comprises a plurality of optical fibre links 196. Each link 196 is coupled to the first optical waveguides 20 of a respective pair of the communication network switching nodes 150, 160. The external optical fibre ring 198 comprises a plurality of optical fibre links 200. Each link 200 is coupled to the fourth optical waveguides 46 of a respective pair of the communication network switching nodes 150, 160.

The internal ring is used for both downstream communication and distribution of the optical carrier signals generated by a remote node while the external ring is only used for upstream communication. The optical signals are subdivided into two optical bands: the upstream band and the downstream band.

The hub node 192 is arranged to cause the communication network to operate in one of a normal mode and a protection mode. In a first normal mode, the hub causes downstream optical signals to propagate around the internal optical fibre ring in a first direction (anti-clockwise in the Figure) and causes upstream optical signals to propagate around the external fibre ring the opposite direction (clockwise in the Figure). In case of failure in one of the internal optical fibre ring links 196*b* in the West, node 150*b* will no longer receive the downstream signals and optical carriers from the anti-clockwise (West) direction. The hub node 192 will therefore invert the direction of transmission and both the downstream optical signals and the optical carrier signals will be received from the clockwise (East) direction. In this first protection mode, the hub 192 causes downstream optical signals and optical carrier signals to propagate around the internal fibre ring in the clockwise direction, and causes upstream optical signals to propagate around the external optical fibre ring in the anticlockwise direction.

In a second normal mode, the hub causes downstream optical signals and optical carriers to propagate around the external optical fibre ring in the clockwise direction and causes upstream optical signals to propagate around the internal fibre ring the anti-clockwise direction. In a second protection mode, the hub 192 causes downstream optical signals and optical carrier signals to propagate around the external fibre ring in the anti-clockwise direction and causes upstream optical signal to propagate around the internal optical fibre ring in the clockwise direction.

Figure 16:
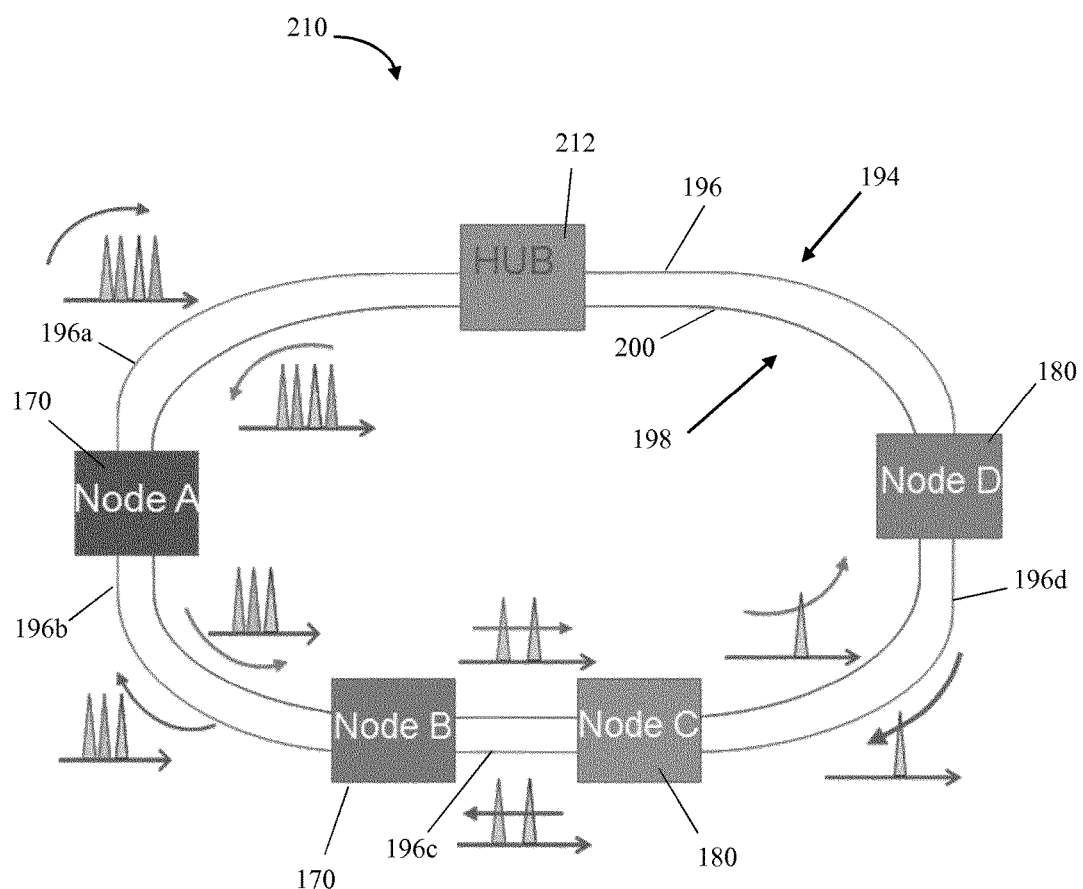
FIG. 16 is a diagrammatic representation of communication network according to a sixteenth embodiment of the invention.

A sixteenth embodiment of the invention provides a communication network 210 as shown in FIG. 16. The network 210 of this embodiment is similar to the network 190 of FIG. 15, with the following modifications.

In this embodiment, the nodes have the structure shown in FIGS. 13 and 14.

This network enables wavelength reuse (FSK/OOK modulation) for enhanced spectral efficiency. Resiliency is ensured by 1:1 protection implemented at the hub node 192, which is able to detect if there is a broken fibre for instance between node A and node B. If so, the hub node 192 changes the direction of downstream transmission, to transmit the downstream signals towards node B in the anti-clockwise, from the East port of the hub.

The downstream optical signals are transmitted on the internal optical fibre ring 200 by the hub node. One or more downstream optical signals are dropped at each node, with all the other wavelengths by-passing the node in question. Each node uses the downstream optical signals as the optical carriers for upstream communication by re-modulating them and transmitting them on the external optical fibre ring 194. FIG. 16 illustrates dropping downstream wavelengths from each of the four nodes and transmission of the re-modulated signals upstream on the external optical fibre ring.

In this example, the downstream optical signals are frequency-shift keying, FSK, modulated. The downstream optical signals to be dropped are coupled from the first optical waveguide 20 into the second or third optical waveguide of the respective optical switches configured to operate at the respective wavelengths. Then an optical splitter 1:2 is used to distribute one copy of the downstream optical signal to the demodulator 122 and another copy to the MRM 60, 62 for the upstream transmission. For the FSK demodulators a micro-ring resonator is used acting as a filter to perform the FM-AM conversion before conversion to an electrical signal by the photodetector 92. The received signal is sent to the electrical cross-point switch 82 for interconnection functions.

For upstream transmission, the MRM 62, 64 are used to remodulate the copy of the downstream optical signal, which is then coupled into the fourth optical fibre 46.

Ports A and C of each node 170, 180 are connected to the internal optical fibre ring 200 used for downstream transmission and the upstream signals are transmitted on the external optical fibre ring 196 (connected to the port B and D of the nodes).

The invention claimed is:

1. An optical switching apparatus, comprising:
   a plurality of optical switches, each optical switch comprising:
      four optical ports;
      a first optical waveguide coupled between a first of said optical ports and a second of said optical ports;
      a first switch element provided between the first optical waveguide and a second optical waveguide that is coupled to a third of said optical ports;
      a second switch element provided between the first optical waveguide and a third optical waveguide that is coupled to a fourth of said optical ports;
      each said switch element comprising a micro-ring resonator having an active state in which it is coupled to the first waveguide and to a respective one of the second and third waveguides for optical signals at a preselected wavelength, and an inactive state in which no coupling occurs, and each switch element comprising a control element arranged to receive a respective control signal configured to cause it to switch the micro-ring resonator between said states,
   the optical switches sharing the same first optical waveguide and each having a respective second and third waveguide;
   an electrical cross-point switch matrix in communication with the optical switches and arranged to receive communications signals from a communication network; and
   a controller arranged to generate and transmit respective control signals to the switch elements.

2. An optical switching apparatus as claimed in claim 1, each optical switch further comprising:
   a fourth waveguide coupled between the third and fourth optical ports;
   a third said switch element provided between the second and fourth optical waveguides;
   a fourth said switch element provided between the third and fourth optical waveguides,
   the micro-ring resonators of the third and fourth switch elements in their active states being coupled to the fourth waveguide and a respective one of the second and third waveguides; and
   optical modulation apparatus arranged to modulate optical signals coupled into the second and third optical waveguides.

3. An optical switching apparatus as claimed in claim 2, wherein the optical modulation apparatus comprises a micro-ring modulator coupled to the second optical waveguide and coupled to the third optical waveguide, the micro-ring modulator is arranged to receive a respective modulation signal arranged to cause it to apply a respective modulation to an optical signal in either of the second and third optical waveguide.

4. An optical switching apparatus as claimed in claim 2, wherein the optical modulation apparatus comprises a first micro-ring modulator coupled to the second optical waveguide and a second micro-ring modulator coupled to the third optical waveguide, each micro-ring modulator arranged to receive a respective modulation signal arranged to cause it to apply a respective modulation to a respective optical signal.

5. An optical switching apparatus as claimed in claim 2, wherein the optical modulation apparatus comprises the micro-ring resonator of one of the first and third switch elements and the micro-ring resonator of one of the second and fourth switch elements.

6. An optical switching apparatus as claimed in claim 1, wherein said plurality of optical switches comprises a first optical switch and a second optical switch,
wherein:
  the second optical switch further comprises:
    a fourth waveguide coupled between the third and fourth optical ports;
    a third said switch element provided between the second and fourth optical waveguides;
    a fourth said switch element provided between the third and fourth optical waveguides,
    the micro-ring resonators of the third and fourth switch elements in their active states being coupled to the fourth waveguide and a respective one of the second and third waveguides; and
    optical modulation apparatus arranged to modulate optical signals coupled into the second and third optical waveguides,
  and wherein the optical switching apparatus further comprises:
  first and second photodetectors, coupled to the third and fourth optical ports respectively of the first optical switch, each photodetector having an output coupled to a respective input of the electrical cross-point switch matrix; and
  a modulation driver arranged to receive a communication signal from the electrical cross-point switch and arranged to generate and transmit modulation signals to the modulation apparatus.

7. An optical switching apparatus as claimed in claim 6, wherein the optical switching apparatus comprises:
  a plurality of said first optical switches;
  a plurality of photodetectors, each coupled to a respective optical port of a respective first optical switch and each having an output coupled to a respective input of the electrical cross-point switch matrix; and
  a plurality of said second optical switches,
  and wherein the second optical switches share the same fourth waveguide.

8. An optical switching apparatus as claimed in claim 7, wherein the apparatus comprises:
  a further plurality of said first optical switches, each comprising first and second switch elements provided between the fourth waveguide and the respective second and third waveguide, and a further plurality of said photodetectors each coupled to a respective optical port of a respective first optical switch and each having an output coupled to a respective input of the electrical cross-point switch matrix.

9. An optical switching apparatus as claimed in claim 1, wherein said optical switches each further comprise:
  a fourth waveguide coupled between the third and fourth optical ports;
  a third said switch element provided between the second and fourth optical waveguides;
  a fourth said switch element provided between the third and fourth optical waveguides,
  the micro-ring resonators of the third and fourth switch elements in their active states being coupled to the fourth waveguide and a respective one of the second and third waveguides; and
  optical modulation apparatus arranged to modulate optical signals coupled into the second and third optical waveguides,
  wherein each optical switch shares the same fourth waveguide, and
  wherein the optical switching apparatus further comprises:
  a plurality of optical splitters;
  demodulation apparatus coupled to the second and third waveguide of each optical switch by respective ones of the optical splitters;
  a plurality of photodetectors, each coupled to the demodulation apparatus and each having an output coupled to a respective input of the electrical cross-point switch matrix; and
  a modulation driver arranged to receive a communication signal from the electrical cross-point switch and arranged to generate and transmit modulation signals to the modulation apparatus.

10. A communication network switching node comprising:
  optical switching apparatus as claimed in claim 1, the optical ports being arranged to couple the first and fourth optical waveguides to a first optical communication network;
  optical to electrical signal conversion apparatus coupled to the electrical cross-point switch matrix and arranged to receive optical signals from a second optical communication network; and
  electrical to optical signal conversion apparatus coupled to the electrical cross-point switch matrix and arranged to output optical signals to the second optical communication network.

11. A communication network switching node as claimed in claim 10, wherein the first optical communication network is a high radio access network and the second optical communication network is a low radio access network.

12. A communication network comprising:
  a hub node;
  a plurality of communication network switching nodes as claimed in claim 10;
  an internal optical fibre ring comprising a plurality of optical fibre links, each link coupled to the first optical waveguides of a respective pair of said communication network switching nodes; and
  an external optical fibre ring comprising a plurality of optical fibre links, each link coupled to the fourth optical waveguides of a respective pair of said communication network switching nodes,
  wherein the hub node is arranged to cause the communication network to operate in one of a normal mode and a protection mode, in the normal mode the hub causes downstream optical signals to propagate around one of the internal optical fibre ring and the external fibre ring in a first direction and causes upstream optical signals to propagate around the other of the internal optical fibre ring and the external fibre ring in a second direction, opposite to the first direction, and in the protection mode the hub causes downstream optical signals to propagate around the other of the internal optical fibre ring and the external fibre ring in the second direction and causes upstream optical signal to propagate around the other of the internal optical fibre ring and the external fibre ring in the first direction.

* * * * *